United States Patent
Boltz et al.

(10) Patent No.: US 10,138,148 B2
(45) Date of Patent: Nov. 27, 2018

(54) BIOFILM MEDIA, TREATMENT SYSTEM AND METHOD OF WASTEWATER TREATMENT

(71) Applicant: Renewable Fibers, LLC, Raleigh, NC (US)

(72) Inventors: Joshua P. Boltz, Englewood, CO (US); Glen T. Daigger, Englewood, CO (US); David Austin, Englewood, CO (US); Bruce Johnson, Englewood, CO (US)

(73) Assignee: RENEWABLE FIBERS, LLC, Raleigh, NC (US)

( * ) Notice: Subject to any disclaimer, the term of this patent is extended or adjusted under 35 U.S.C. 154(b) by 8 days.

(21) Appl. No.: 14/719,233

(22) Filed: May 21, 2015

(65) Prior Publication Data

US 2015/0336827 A1  Nov. 26, 2015

Related U.S. Application Data

(60) Provisional application No. 62/001,241, filed on May 21, 2014.

(51) Int. Cl.
*C02F 3/30* (2006.01)
*C02F 3/10* (2006.01)
(Continued)

(52) U.S. Cl.
CPC ............. *C02F 3/30* (2013.01); *C02F 1/385* (2013.01); *C02F 3/006* (2013.01); *C02F 3/104* (2013.01);
(Continued)

(58) Field of Classification Search
CPC combination set(s) only.
See application file for complete search history.

(56) References Cited

U.S. PATENT DOCUMENTS

| 4,615,807 A | 10/1986 | Haines et al. |
| 5,192,441 A | 3/1993 | Sibony et al. |

(Continued)

FOREIGN PATENT DOCUMENTS

| CN | 102858696 A | 1/2013 |
| EP | 2 163 524 A1 | 3/2010 |

(Continued)

OTHER PUBLICATIONS

Australian Examination Report, dated Feb. 15, 2017, for Australian Application No. 2014340220, 3 pages.
(Continued)

*Primary Examiner* — Katherine Zalasky
*Assistant Examiner* — Ryan B Huang
(74) *Attorney, Agent, or Firm* — Seed IP Law Group LLP

(57) ABSTRACT

Described herein are systems and methods for treatment of contaminated water employing a mobile supported biofilm. The treatment systems include a bioreactor, a mobile biofilm disposed within the bioreactor, and a solid-solid separation unit attached to the bioreactor. The solid-solid separation unit is adapted to receive an effluent stream from the bioreactor, wherein the effluent contains the mobile biofilm, and separate at least a portion of the mobile biofilm from the effluent and return it to the bioreactor.

16 Claims, 6 Drawing Sheets

(51) Int. Cl.
*C02F 1/38* (2006.01)
*C02F 3/00* (2006.01)
C02F 3/08 (2006.01)
C02F 101/16 (2006.01)
C02F 3/20 (2006.01)
C02F 3/28 (2006.01)
C02F 103/00 (2006.01)

(52) U.S. Cl.
CPC ............... *C02F 3/105* (2013.01); *C02F 3/20* (2013.01); *C02F 3/2806* (2013.01); *C02F 3/301* (2013.01); *C02F 3/307* (2013.01); *C02F 2003/001* (2013.01); *C02F 2101/16* (2013.01); *C02F 2103/001* (2013.01); *C02F 2203/00* (2013.01); *C02F 2209/001* (2013.01); *C02F 2209/02* (2013.01); *C02F 2209/06* (2013.01); *C02F 2209/10* (2013.01); *C02F 2209/22* (2013.01); *Y02W 10/15* (2015.05)

(56) References Cited

U.S. PATENT DOCUMENTS

| | | | |
|---|---|---|---|
| 5,536,410 | A | 7/1996 | Kitatsuji et al. |
| 5,626,755 | A | 5/1997 | Keyser et al. |
| 5,846,424 | A | 12/1998 | Khudenko |
| 6,787,035 | B2 * | 9/2004 | Wang ................. C02F 3/12 210/220 |
| 6,926,830 | B2 | 8/2005 | Ho et al. |
| 7,481,934 | B2 | 1/2009 | Skillicorn |
| 7,537,926 | B2 | 5/2009 | Maga et al. |
| 7,569,147 | B2 | 8/2009 | Curtis et al. |
| 8,911,628 | B2 | 12/2014 | Nyhuis |
| 2004/0079692 | A1 | 4/2004 | Cote et al. |
| 2005/0082222 | A1 | 4/2005 | Austin |
| 2006/0243661 | A1 | 11/2006 | You et al. |
| 2007/0170115 | A1 | 7/2007 | Skillicorn |
| 2007/0209999 | A1 | 9/2007 | Smith |
| 2009/0014387 | A1 | 1/2009 | Probst |
| 2011/0005284 | A1 * | 1/2011 | Conner ................. C02F 3/1268 71/12 |
| 2011/0146976 | A1 | 6/2011 | Hackworth et al. |
| 2011/0198284 | A1 | 8/2011 | Nyhuis |
| 2011/0203992 | A1 | 8/2011 | Liu et al. |
| 2011/0272350 | A1 | 11/2011 | Skillicorn et al. |
| 2011/0281321 | A1 | 11/2011 | Skillicorn |
| 2012/0043277 | A1 | 2/2012 | Smith et al. |
| 2013/0068688 | A1 | 3/2013 | Ager et al. |
| 2013/0233792 | A1 | 9/2013 | Brown, III |
| 2013/0233794 | A1 | 9/2013 | Brown |
| 2013/0319940 | A1 | 12/2013 | Josse et al. |
| 2014/0008280 | A1 | 1/2014 | Husain et al. |
| 2014/0144836 | A1 * | 5/2014 | Nyhuis ................. C02F 9/00 210/605 |
| 2015/0108067 | A1 * | 4/2015 | Calhoun ................. C02F 3/08 210/610 |

FOREIGN PATENT DOCUMENTS

| | | |
|---|---|---|
| EP | 2 366 673 A1 | 9/2011 |
| WO | 02/079103 A2 | 10/2002 |
| WO | 2013/049046 A1 | 4/2013 |
| WO | 2014/012817 A1 | 1/2014 |

OTHER PUBLICATIONS

Calhoun, "Reduction of Substances in Contaminated Fluids Using a Naturally Occuring Biological Growth Media," U.S. Appl. No. 61/894,232, filed Oct. 22, 2013, 47 pages.
International Search Report, dated Oct. 6, 2015, for International Application No. PCT/US2015/032057, 4 pages.
International Search Report and Written Opinion of the International Searching Authority, dated Jan. 29, 2015, for International Application No. PCT/US2014/061607, 13 pages.
Written Opinion of the International Searching Authority, dated Oct. 6, 2015, for International Application No. PCT/US2015/032057, 7 pages.
Australian Examination Report No. 2, dated Jul. 25, 2017, for Australian Application No. 2014340220, 3 pages.
Chinese Office Action, dated Jun. 23, 2017, for Chinese Application No. 201480070145.7, 19 pages. (with English Translation).
Office Action, dated Jun. 2, 2017, for U.S. Appl. No. 14/519,842, Calhoun, "Reduction of Substances in Contaminated Fluids Using a Naturally Occurring Biological Growth Media," 26 pages.
Extended European Search Report, dated May 4, 2017, for European Application No. 14854935.5-1371 / 3060527, 8 pages.
Chinese Office Action, dated Mar. 22, 2018, for Chinese Application No. 201480070145.7, 8 pages. (with English Translation).
Japanese Office Action, dated May 8, 2018, for Japanese Application No. 2016-525100, 10 pages. (with English Translation).
Australian Examination Report, dated Feb. 8, 2018, for Australian Application No. 2015264014, 4 pages.
Extended European Search Report, dated Jan. 2, 2018, for European Application No. 15796397.6-1371, 7 pages.
Office Action, dated Nov. 28, 2017, for U.S. Appl. No. 14/519,842, Calhoun, "Reduction of Substances in Contaminated Fluids Using a Naturally Occurring Biological Growth Media," 34 pages.
U.S. Appl. No. 14/519,842, filed Oct. 21, 2014, Reduction of Substances in Contaminated Fluids Using a Naturally Occurring Biological Growth Media.

* cited by examiner

BIOFILM MEDIA, TREATMENT SYSTEM AND METHOD OF WASTEWATER TREATMENT

CROSS REFERENCE TO RELATED APPLICATION

This application claims the benefit of priority to U.S. Application No. 62/001,241, filed May 21, 2014 and entitled BIOFILM MEDIA TREATMENT SYSTEM, AND METHOD OF TREATMENT, which is hereby incorporated by reference.

TECHNICAL FIELD

The disclosures herein relate to systems and methods for treatment of contaminated water employing a mobile biofilm.

JOINT RESEARCH AGREEMENT

The subject matter claimed herein was made as a result of activities undertaken within the scope of a joint research agreement. The parties to the joint research agreement are (1) Renewable Fibers, LLC dba RF Wastewater and (2) CH2M Hill Engineers, Inc.

BACKGROUND

Water is an important natural resource that is essential to life. Approximately 71 percent of the surface of the Earth is occupied by water. However, only 2.5 percent of the water found on Earth is considered fresh water (i.e., is not salt water or brackish water; both of which are unfit for human consumption). Furthermore, 98.8 percent of this fresh water is contained in ice and ground water. Less than 0.3 percent of all fresh water may be found in surface water bodies such as lakes and rivers. Contaminated waters are detrimental to the environment and public health. Consequently, regulations governing the treatment and monitoring of contaminated water exists in developed countries such as the United States of America. Similar standards for the treatment and monitoring of contaminated waters are emerging in developing countries across the globe.

Although dependent on the source and nature of the water pollutant(s), the treatment of a contaminated water involves a series of processing steps that are arranged to meet a specific treatment objective, or treatment objectives, with maximum efficiency and minimum total life-cycle cost (i.e., the combination of capital and operating costs for a predetermined operating life typically defined as 20 years). Contaminated waters include, but are not limited to, reclaimed water, potable water, storm water, industrial wastewater, and municipal wastewater. The latter, municipal wastewater for example, contains both particulate and dissolved organic pollutants and nutrients—primarily the macronutrients nitrogen and phosphorus. Processing municipal wastewater with a centralized wastewater treatment plant involves four main process components: preliminary, primary, secondary, and tertiary treatment. The first process component serves to remove large, non-biodegradable particulate matter and is known as preliminary treatment (e.g., screening and grit removal). The second process component serves to remove readily settleable organic and inorganic particulate matter and is known as primary treatment. Primary treatment is accomplished with sedimentation basins, or primary clarifiers, and dissolved air flotation units.

The third process component is known as secondary treatment and incorporates a biological wastewater treatment process. A secondary treatment process typically includes a biological reactor, or bioreactor, and liquid-solid separation unit process. Together, the bioreactor and liquid-solid separation unit processes (e.g., sedimentation basin, dissolved air flotation, or membranes) remove biodegradable organic matter (dissolved and particulate) and suspended solids. When designed to do so, the bioreactor and liquid-solid separation unit processes are also capable of nutrient removal (e.g., nitrogen, phosphorus, or nitrogen and phosphorus). The bioreactor maintains specific environmental conditions required to develop and maintain a bacterial population that is capable of biochemically oxidizing (e.g., organic pollutants quantified as five-day biochemical oxygen demand, $BOD_5$; ammonia-nitrogen, $NH_3$—N) or reducing (e.g., nitrite-nitrogen, $NO_2$—N; nitrate-nitrogen, $NO_3$—N) pollutants in the contaminated water stream depending on the treatment objective. The liquid-solid separation unit process separates bacteria and particulate matter remaining in the effluent stream of the bioreactor from the treated water. Bacteria may exist in biological flocs (i.e., suspended growth) or in a biofilm. The fourth process component is tertiary treatment. A variety of tertiary treatment processes exist depending on the treatment objective and may include chemically enhanced tertiary clarification (for phosphorus removal), granular media filtration (e.g., with sand filters), or advanced oxidation processes. Disinfection of the wastewater treatment plant effluent prior to discharging the effluent stream may be accomplished with chlorine or ultraviolet light, to name a couple disinfection alternatives and is typically included in the definition of tertiary treatment.

The biochemical transformation of dissolved organic compounds, that is, the third process component that is typically characteristic of centralized municipal wastewater treatment plants, is most commonly carried out using a suspended growth process (i.e., a variation of the activated sludge process). Suspended growth processes include microorganisms (as bacteria) that biochemically transform pollutants—typically organic matter and the nutrients nitrogen and phosphorus in the contaminated water stream—into biomass and other reaction by-products.

Suspended growth processes can be modified such that there is also biofilm. In such a case, the process is compartmentalized and the respective bacterial forms are referred to as the suspended growth compartment and biofilm compartment. Biofilms are a thin, usually resistant, layer of microorganisms (as bacteria) that form on and coat various surfaces. The surfaces upon which biofilms grow are known as substratum. Biofilms are typically used for the oxidation of readily biodegradable organic matter (or organic matter that can easily diffuse into the biofilm) and/or the oxidation or reduction of nitrogenous compounds from contaminated water, either alone or combined with suspended growth in a single bioreactor. When used in conjunction with a suspended growth compartment, the biofilm area is established to support the growth of slow-growing bacteria that would otherwise not exist in the suspended growth compartment in a significant quantity at the solids residence time characteristic of the suspended growth compartment. The use of suspended growth and biofilm compartments together allows a process to meet the treatment objective(s) that would otherwise require additional bioreactor volume and secondary clarifier area. Thereby, the capital cost due to construction and land that is required to add process tanks and process mechanical equipment is avoided which typically results in substantial cost savings.

In other cases, provision and maintenance of a biofilm results in a more constant microorganism population which maximizes contaminated water treatment efficiency and consistency. Bioreactors that use only a biofilm compartment include the trickling filter (TF), rotating biological contactor (RBC), biologically active filter (BAF), moving bed biofilm reactor (MBBR), fluidized bed biofilm reactor (FBBR), granular sludge reactor (GSR), and membrane biofilm reactor (MBfR). Systems that make use of both suspended growth and biofilm compartments are commonly referred to as integrated fixed-film activated sludge (IFAS) processes. The substratum for biofilms used to treat contaminated water includes powdered natural lingo-cellulosic materials, sand (particulate biofilms), non-biodegradable bacterial materials (i.e., granular sludge), and man-made materials such as polystyrene and high-density polyethylene.

Skillicorn, U.S. Pat. No. 7,481,934 describes the use of kenaf fibers (a powdered natural lingo-cellulosic material) that act both as biodegradable adsorbent and substratum for biofilm growth when combined with suspended growth in an activated sludge process for contaminated water treatment. The biofilm is allowed to settle in the liquid-solid separation unit (assumed to be a sedimentation basin), along with the suspended growth, receiving bioreactor effluent. In some cases, the liquid-solid separation process is aided by chemical flocculation (i.e., chemically enhanced clarification), and the biofilm/suspended growth mixture is separated from the treated water. In other cases, some of the biofilm/suspended growth mixture is returned to the bioreactor influent (i.e., via a return activated sludge stream) as an inoculant for an additional treatment cycle.

Brown, U.S. Patent Pub. Nos. 2013/0233,792 and 2013/0233,794 describes the use of lignocellulosic fibers, such as kenaf fibers, to form biofilms containing both aerobic and anaerobic bacteria. For example, biofilms containing both aerobic and anaerobic zones may support the development of ammonia oxidizing bacteria (AOB) in the aerobic zones and anaerobic ammonia oxidizing bacteria (Anammox) in the anaerobic zone; therefore, the biofilm may convert ammonia-nitrogen to nitrogen gas in a single bioreactor without recirculation and the provision of an external carbon source. The biofilm is allowed to settle with suspended growth in the liquid-solid separation unit process. No separation of the biofilm from other solids is carried out.

Veolia Water Solutions & Technologies sells ANOXKALDNES® MBBR and hybrid biofilm-activated sludge (HYBAS®) processes. Both of these processes include free-moving plastic biofilm carriers that are retained in a specific bioreactor, or bioreactor zone, with stainless steel screens constructed of wedge wire or perforated plates. The screens are included in the process package along with stainless steel, medium-bubble diffusers in aerobic zones and/or curved-blade mixers in anoxic zones. The free-moving plastic biofilm carriers typically range in size from 10 to 50-mm in diameter and resemble a honeycomb. The free-moving plastic biofilm carriers are permanently retained within the bioreactor.

SUMMARY

Disclosed herein is a treatment system including a bioreactor including an inlet adapted to receive an influent having one or more contaminants, a mobile biofilm disposed therein, and an outlet adapted to dispense a bioreactor effluent comprising the mobile biofilm; and a solid-solid separation unit attached to the bioreactor outlet and adapted to receive and separate at least a portion of the bioreactor effluent into a stream comprising mobile biofilm and a stream comprising residual solids, and return the stream comprising the mobile biofilm to the bioreactor. In some embodiments, the bioreactor includes aerobic conditions, anoxic conditions, anaerobic conditions, or a combination of two or more thereof. In some embodiments, the solid-solid separation unit includes an inlet in fluid communication with the bioreactor outlet, a first outlet to dispense the stream comprising mobile biofilm, and a second outlet to dispense the stream comprising residual solids. In some embodiments, the solid-solid separation unit includes a hydrocyclone.

In some embodiments, the treatment system further includes a liquid-solid separation unit adapted to receive the stream including residual solids from the hydrocyclone and further separate the stream into secondary effluent and underflow. In some embodiments, the treatment system further includes a liquid-solid separation unit disposed in fluid communication between the bioreactor outlet and the hydrocyclone, the liquid-solid separation unit adapted to receive and separate the bioreactor effluent into a secondary effluent portion and an underflow portion, wherein the hydrocyclone is adapted to receive and separate at least a portion of the underflow portion of the bioreactor effluent. In some such embodiments, the underflow is divided into a first underflow portion and second underflow portion, wherein the first underflow portion is returned to the bioreactor and the second underflow portion) is directed to the hydrocyclone.

In some embodiments of the treatment system, the bioreactor effluent is divided into a first bioreactor effluent and a second bioreactor effluent, wherein a liquid-solid separation unit is adapted to receive and separate the first bioreactor effluent into a secondary effluent portion and an underflow portion, and direct the underflow portion to the bioreactor; and the hydrocyclone is adapted to receive and separate the second bioreactor effluent into a mobile biofilm portion and a residual solids portion, and direct the mobile biofilm portion to the bioreactor.

In some embodiments of the treatment system, the mobile biofilm includes lignocellulosic particles or biological granules. In some embodiments of the treatment system, the stream including mobile biofilm includes between 50% and 100% of the mobile biofilm present in the bioreactor effluent portion received by the hydrocyclone.

In some embodiments of the treatment system, the bioreactor is a first bioreactor, and the system further includes a second bioreactor disposed in fluid communication between the hydrocyclone and the first bioreactor and adapted to receive the mobile biofilm stream from the hydrocyclone, the secondary bioreactor having a first inlet for receiving the mobile biofilm stream, a second inlet for receiving a second bioreactor influent, and an outlet for dispensing a second effluent, wherein the second effluent is directed to the first bioreactor. In some such embodiments, the first and second bioreactor influents are different. In some such embodiments, the secondary bioreactor includes aerobic conditions, anoxic conditions, anaerobic conditions, or a combination of two or more thereof. In some such embodiments, the treatment system further includes a third bioreactor adapted to receive the stream including residual solids from the hydrocyclone, the third bioreactor having a first inlet for receiving the stream comprising residual solids, a second inlet for receiving a third bioreactor influent, and an outlet for dispensing a third effluent. In some such embodiments, the third bioreactor influent is different from the first and second bioreactor influents.

In some embodiments, the treatment system further includes a second bioreactor adapted to receive the stream comprising residual solids from the hydrocyclone, the second bioreactor having a first inlet for receiving the stream comprising residual solids, a second inlet for receiving a second bioreactor influent, and an outlet for dispensing a second effluent.

Also disclosed herein is a method of treating wastewater, the method including: (a) adding a first influent and a mobile biofilm to a first bioreactor; (b) providing conditions suitable for the mobile biofilm to biochemically transform one or more contaminants in the influent to form an effluent including at least the mobile biofilm, water, and residual solid matter; (c) cyclonically isolating 50% to 100% of the mobile biofilm from a first portion of the effluent to form an isolated mobile biofilm stream and a residual solids stream, and returning the isolated mobile biofilm stream to the first bioreactor; and (d) separating a substantial portion of the water from a second portion of the effluent to form an underflow.

In some embodiments, (a) further includes adding suspended growth to the first bioreactor.

In some embodiments, the method is carried out in the order (a), (b), (c), (d), wherein the residual solids stream from (c) is the second portion of effluent in (d), and further including disposing of the underflow or subjecting the underflow to further treatment.

In other embodiments, the method is carried out in the order (a), (b), (d), (c), wherein the underflow from (d) is the first portion of the effluent in (c), and further including disposing of the residual solids stream or subjecting the residual solids stream to further treatment. In some such embodiments, the method further includes partitioning the underflow into a first underflow and second underflow, and directing the first underflow to the first bioreactor, wherein the second underflow is the first portion of the effluent in (c).

In some embodiments, the method is carried out in a manner whereby (c) and (d) are carried out contemporaneously, and the method further includes disposing of the residual solids stream or subjecting the residual solids stream to further treatment; and directing the underflow to the first bioreactor.

In some embodiments, the method further includes directing the isolated mobile biofilm stream to a second bioreactor prior to returning it to the first bioreactor; and adding a second influent to the second bioreactor. In some such embodiments, the method further includes directing the residual solids stream to a third bioreactor; and adding a third influent to the third bioreactor.

In some embodiments, the method further includes directing the residual solids stream to a second bioreactor; and adding a second influent to the second bioreactor.

Additional advantages and novel features of the invention will be set forth in part in the description that follows, and in part will become apparent to those skilled in the art upon examination of the following, or may be learned through routine experimentation upon practice of the invention.

DETAILED DESCRIPTION

Figure 1:
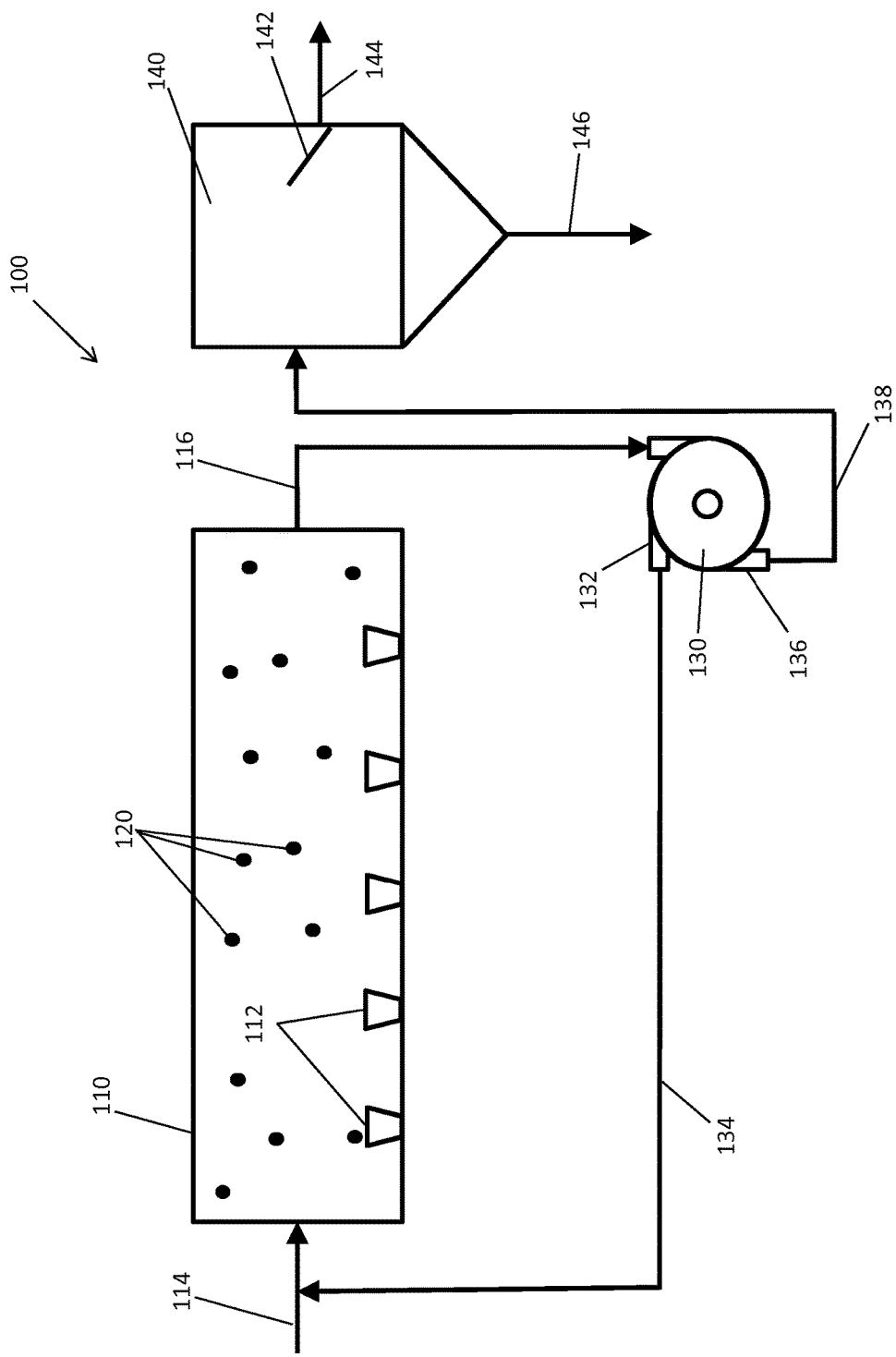
FIG. 1 is a schematic view of a first embodiment of a treatment system of the invention.

Although the present disclosure provides references to preferred embodiments, persons skilled in the art will recognize that changes may be made in form and detail without departing from the spirit and scope of the invention. Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Definitions

As used herein, the term "suspended growth" means a biological floc, that is, a flocculent mass of microorganisms (as bacteria) that are suspended in water. The bacteria are living or dead, or a combination thereof. A floc is an open structure when compared with mobile biofilms and does not contain a substratum.

As used herein, the term "mobile biofilm" means a biofilm supported by a substratum wherein the combined biofilm and substratum are able to move into, within, and out of a bioreactor along with water, residual solids, and any suspended growth present. The biofilm substratum is particulate in nature and includes such materials as powdered lignocellulosic materials, sand, non-biodegradable bacterial materials, and synthetic particulates formed from, for example, polystyrene or high density polyethylene.

As used herein, the term "liquid-solid separation unit" means any device employed to substantially separate undissolved, or suspended, solids from a liquid such as water. Such devices include, but are not limited to, membrane filtration units, clarification (or sedimentation) tanks units, granular media filtration units, dissolved air flotation units, ballasted flocculation clarification (or sedimentation) units, centrifuges, and the like. A "liquid-solid separation unit process" is the process of separating carried out by the selected liquid-solid separation unit.

As used herein, the term "solid-solid separation unit" means any device employed to substantially separate mobile biofilm from other undissolved, or suspended, solids in a liquid or sludge stream based on factors included, but not limited to, centripetal force, fluid resistance (drag), settling velocity, and particle characteristics such as size, shape, and density. Such devices include, but are not limited to, hydrocyclones, lamella plate settlers, screens, sieves, spitzkasten (a series of cones that sequentially separates particle based on size), double-cone classifiers, elutriators (vertical columns), barbotage (bubbling) chambers, and flotation chambers. In some embodiments, a solid-solid separation unit includes two more such devices, wherein the devices are the same or different; e.g. 4 hydrocyclones arranged in series, or a flotation chamber coupled with a barbotage chamber, and the like. A "solid-solid separation unit process" is the process of separating carried out by the selected solid-solid separation unit.

As used herein, the term "sludge" means compacted organic and inorganic particulate matter suspended in a bioreactor effluent stream or separated therefrom using a liquid-solid or solid-solid separation unit. The particulate matter contains suspended growth and other particulates. In some embodiments the sludge contains mobile biofilm. Typically the sludge is compacted by separation processes carried out in a liquid-solid separation unit where the suspended growth, and other particulate matter, is separated from the bioreactor effluent. In some embodiments, a portion of the sludge is returned to the bioreactor as influent thereto. In such embodiments, this portion of the sludge is referred to as "return activated sludge" or RAS. In order to maintain a stable suspended growth mass (typically valuated using a stable suspended solids concentration) in the bioreactor a portion of the sludge is disposed of, typically at a rate equivalent to the rate of bacterial growth, or yield. The disposed sludge may be subjected to further treatment(s) such as thickening, digestion, and/or dewatering prior to disposal. Sludge thickening units, digestion units, dewatering units, and sometimes other technologies are collectively referred to as solids management facilities. The wasted portion of sludge is referred to as "waste activated sludge" or WAS.

As used herein, the term "waste solids" means a stream containing particulate matter (e.g., detached biofilm fragments) that is flowing directly from a bioreactor without having particulate matter removed in a liquid-solid separation unit process, or is the compacted solids flowing from a liquid-solid separation unit process. "Waste solids" are unique to systems that do not accumulate suspended growth by means of a return activated sludge stream. In some embodiments the waste solids are subjected to further treatment(s) prior to disposal.

As used herein, the term "bioreactor influent" means water flowing into a bioreactor having one or more contaminants (a.k.a., pollutants) present therein. Sources of bioreactor influent include, but are not limited to, reclaimed water, potable water, storm water, industrial wastewater, and municipal wastewater.

As used herein, the term "bioreactor effluent" means water flowing from a bioreactor that has not had particulate matter removed in a liquid-solid separation unit process. The water constituting the bioreactor effluent stream has had all or a portion of contaminants in the bioreactor influent stream oxidized or reduced by bacterially induced biochemical transformation processes resulting from a specific set of environmental conditions in the bioreactor (e.g., temperature, pH, dissolved oxygen concentration, and suspended solids concentration). Bacteria exist as mobile biofilm and optional suspended growth.

As used herein, the term "secondary effluent" means a bioreactor effluent having a substantial portion of solids removed therefrom, wherein the solids are separated from the liquid by a liquid-solid separation unit such as a sedimentation basin.

As used herein, the term "underflow" means the compacted suspended solids, or sludge, that flows from a liquid-solid separation unit process. In some embodiments, the underflow rate is the bioreactor effluent flow rate minus the secondary effluent flow rate. In some embodiments underflow includes mobile biofilm.

As used herein, the term "separated mobile biofilm" mean the mobile biofilm that is separated from one or more additional solids in a bioreactor effluent by a solid-solid separation unit process.

As used herein, the term "bioreactor withdrawal" means the extraction of solid materials (including suspended growth, mobile biofilm, residual solids, and other particulate material) for wasting directly from the bioreactor instead of extracting the solid materials for wasting from the liquid-solid separation unit underflow via waste activated sludge, or WAS. Depending on treatment objectives and wastewater characteristics, internal withdrawal can be extracted from any point in the bioreactor, or from any zone if the bioreactor is partitioned.

As used herein, the term "internal recirculation" means the extraction of suspended solids (including suspended growth, mobile biofilm, residual solids, and other particulate material) from a specific position (or specific zone in a partitioned bioreactor) and conveyance of these suspended solids to another position (or specific zone in a partitioned bioreactor) inside the bioreactor.

As used herein, the term "aerobic" means living, active, or occurring only in the presence of oxygen.

As used herein, the term "anoxic" means living, active, or occurring only in the absence of oxygen, but with a substantial presence of nitrate-nitrogen and/or nitrite-nitrogen.

As used herein, the term "anaerobic" means living, active, or occurring only in the absence of oxygen, nitrate-nitrogen, and nitrite-nitrogen.

As used herein, the term "partition" or "partitioned" relates to bioreactors and indicates a bioreactor separated into two or more zones. A zone is defined as an area within a bioreactor having different conditions from another zone, wherein the conditions are selected from aerobic, anoxic, and anaerobic conditions. A particular bioreactor environmental condition is not limited aerobic, anoxic, or anaerobic. In some bioreactor zones, the environmental condition is cyclically alternated between two or more different environmental conditions (e.g., the environmental condition is aerobic for a pre-determined period until the air flow is terminated which results in the environment being anaerobic until the air flow is re-engaged). In some embodiments, zones are physically separated, for example, by one or more partitions, or walls. Partitions include weir walls, submerged weir walls, curtains, or other physical separation devices. In some embodiments, one or more partitions are positioned parallel to the direction of flowing contaminated water in a bioreactor thereby creating bioreactors in parallel. In other embodiments, one or more partitions are positioned perpendicular to the direction of flowing wastewater in a bioreactor thereby creating bioreactors in series. In other embodiments, the zones are separated solely by flow, for example by adding no oxygen in an upstream portion of a bioreactor, and adding oxygen in a downstream portion of the bioreactor. Any of these partitioned embodiments are encompassed when referring to a partitioned bioreactor below, unless specified otherwise. Any bioreactor described herein can be a partitioned bioreactor whether or not it has been specified as such in a particular embodiment. A representative example of a specific partitioning scheme does not limit the embodiment as to other partitioning schemes, unless specified otherwise.

As used herein, the term "about" modifying, for example, concentration, volume, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods; and like proximate considerations. The term "about" also encompasses amounts that differ due to aging of a material with a particular initial concentration or mixture, and amounts that differ due to mixing or processing a material with a particular initial concentration or mixture. Where modified by the term "about" the claims appended hereto include equivalents to these quantities.

As used herein, the word "substantially" modifying, for example, a property, a measurable quantity, a method, a position, a value, or a range, employed in describing the embodiments of the disclosure, refers to a variation that does not affect the overall recited property, quantity, method, position, value, or range thereof in a manner that negates an intended property, quantity, method, position, value, or range. Where modified by the term "substantially" the claims appended hereto include equivalents to these quantities, methods, positions, values, or ranges.

Treatment Systems

We report herein systems for the treatment of contaminated water that include at least a bioreactor, mobile biofilm, and a solid-solid separation unit. In some embodiments the system further includes a liquid-solid separation unit. In some embodiments the bioreactor supports a single condition (i.e., aerobic, anoxic, or anaerobic). In other embodiments the bioreactor is partitioned to include two or more environmental conditions including aerobic, anoxic, and/or anaerobic states. In some embodiments the solid-solid separation unit is adapted to receive output directly from the bioreactor. In some embodiments where the bioreactor also includes a liquid-solid separation unit, the bioreactor is attached to the liquid-solid separation unit and the solid-solid separation unit is adapted to receive an output from the liquid-solid separation unit.

In each embodiment, the flow received by the solid-solid separation unit includes a mobile biofilm. The mobile biofilm is employed to circulate through the bioreactor, wherein the solid-solid separation unit is adapted to separate the mobile biofilm from one or more additional flow components and direct the mobile biofilm into a bioreactor. Where a liquid-solid separation unit is employed, the bioreactor, liquid-solid separation unit, and solid-solid separation unit are advantageously arranged in various configurations.

The bioreactor effluent, liquid-solid separation unit underflow, and bioreactor withdrawal contains mobile biofilm. The secondary effluent is substantially separated from all solids present in the wastewater treatment system. Individual separated components, portions thereof, combined components, or portions thereof, are returned to a bioreactor influent or directly to a bioreactor for the treatment of contaminated influent streams. The remaining components, portions thereof, combined components, or portions thereof are isolated and subjected to further treatment and/or waste disposal processes using conventional technology.

We further report herein a treatment system for the removal of contaminants from waters including, but not limited to, reclaimed water, potable water, storm water, industrial wastewater, and municipal wastewater. The treatment system includes a mobile biofilm situated within a single-stage bioreactor, partitioned bioreactor, or two or more single-stage or partitioned bioreactors situated in series. In various embodiments, a single-stage bioreactor has a single environmental condition (e.g., aerobic, anoxic, or anaerobic). In other embodiments, a single-stage bioreactor has alternating conditions that change from one environmental condition to another by alternating between aerobic, anoxic, or anaerobic conditions (e.g., the environmental condition is aerobic for a pre-determined operating period until the air flow is terminated which results in the environmental condition being anaerobic until the air flow is re-engaged). In still other embodiments, the bioreactor is partitioned; that is, the bioreactor has one or more environmental conditions that are aerobic, anoxic, or anaerobic. In still other embodiments, the treatment system includes multiple bioreactors arranged in series.

The bioreactor influent stream is contaminated with pollutants. The pollutants include, but are not limited to, one or more of particulate organic matter, dissolved organic matter, nitrogenous compounds, and phosphoric compounds. In some embodiments, the dissolved oxygen that is required for aerobic biochemical transformation processes is fed into a bioreactor by releasing compressed air through macroscopic orifices or porous materials such as those in fine-bubble diffusers. In one such an embodiment, centrifugal compressors (operating at low pressure) known as blowers compress air that is conveyed to fine-pore diffusers, or the like, through a piping network. Where the gas is air, the fine-pore diffusers release small-diameter air bubbles. Thereby, the air provides sufficient dissolved oxygen to meet process requirements in an aerobic bioreactor, or aerobic zones of a partitioned bioreactor, and energy imparted by air flowing into the bioreactor further provides adequate mixing and prevents settling of the bioreactor contents. During use, a contaminated influent stream to a bioreactor is treated such that the bioreactor effluent stream includes treated water, mobile biofilm, and other dissolved and particulate matter. In some embodiments, the bioreactor effluent stream includes suspended growth.

A first set of embodiments is directed to a treatment system. In the first set of embodiments, a solid-solid separation unit is adapted to receive the bioreactor effluent stream in its entirety. Various process mechanical, control and monitoring equipment are employed in various embodiments to control the bioreactor effluent stream to the solid-solid separation unit according to processing principles well understood to those of skill. In this first set of embodiments, the mobile biofilm is separated from the remaining particulate matter by the solid-solid separation unit. The separated mobile biofilm is directed to the bioreactor influent, or a pre-determined zone of a partitioned bioreactor, for example through process piping by the action of a pump. After flowing through the solid-solid separation unit, the bioreactor effluent is directed into a liquid-solid separation unit, for example through process piping by the action of a pump. The liquid-solid separation unit separates secondary effluent from the underflow.

In some embodiments, the secondary effluent is directed from the liquid-solid separation unit into a downstream unit process for further treatment or a pump station for conveyance. In some embodiments, the underflow is conveyed to solids management facilities.

A second set of embodiments is directed to another treatment system. In the second set of embodiments, a liquid-solid separation unit is adapted to receive the entire bioreactor effluent. Various process mechanical, control and monitoring equipment are employed in various embodiments to provide and control the stream of bioreactor effluent to the liquid-solid separation unit according to processing principles well understood to those of skill. The liquid-solid separation unit separates the bioreactor effluent into secondary effluent and underflow. The underflow includes the mobile biofilm in addition to other solids. In some embodiments, the secondary effluent is directed to a downstream unit process for further treatment or a pump station for conveyance.

In some of this second set of embodiments, a first portion of underflow is returned to the bioreactor influent as return activated sludge (or RAS). The first portion of the underflow also contains a portion of the mobile biofilm. Various process mechanical, control and monitoring equipment are employed in various embodiments to control the return activated sludge to the bioreactor according to processing principles well understood to those of skill. In such embodiments, a solid-solid separation unit is adapted to receive a second portion of underflow and separate the mobile biofilm from the second portion of the underflow; the separated biofilm is returned to a bioreactor, and the remaining second portion of the underflow includes waste activated sludge. Various process mechanical, control and monitoring equipment are employed in various embodiments to control the second portion of underflow to the solid-solid separation unit, and provide and control the return of the separated mobile biofilm to the bioreactor influent, or to a pre-determined zone of a partitioned bioreactor, according to processing principles well understood to those of skill. In some embodiments, the WAS is conveyed to solids management facilities.

Alternatively, in the second set of embodiments, the separated mobile biofilm is directed to a second bioreactor that is further adapted to be supplied with a secondary bioreactor influent. In such embodiments, the bioreactor discussed above is referred to as the first bioreactor. In some embodiments, the secondary bioreactor influent is different from the first (primary) bioreactor influent. In some embodiments, the environmental conditions in the second bioreactor are different from the environmental conditions present in the first bioreactor (or conditions present in one or more zones of a first partitioned bioreactor). As a further alternative in the second set of embodiments, the WAS is directed to a third bioreactor that is further adapted to be supplied with a tertiary bioreactor influent. In some embodiments, the tertiary bioreactor influent is different from the primary and secondary bioreactor influent streams. In some embodiments, the environmental conditions in the third bioreactor are different from the conditions present in the first and second bioreactor (or conditions present in one or more zones of a first and/or second partitioned bioreactor).

In one illustrative example, a second bioreactor is adapted to receive a secondary bioreactor influent that is a second wastewater stream which, when treating municipal wastewater, has relatively high ammonia-nitrogen (e.g., 1,000 mg N/L) and ortho-phosphorus (e.g., 200 mg P/L) concentrations and low volumetric flow rate when compared with the primary bioreactor influent stream. In such embodiments, the second bioreactor is subjected to precise dissolved oxygen, pH, and temperature control to foster the development of biofilms that contain one or more redox zones and select for one or more specific bacteria type(s). For example, in some embodiments the different redox zones are required to form primarily ammonia oxidizing bacteria, or AOB, in the aerobic biofilm zone and primarily anaerobic ammonia oxidizing bacteria, or Anammox, in the anaerobic biofilm zone. The secondary bioreactor is adapted to feed the mobile biofilm to the first bioreactor influent, or a pre-determined zone of the first partitioned bioreactor, to facilitate deammonification in the first bioreactor, or first zone of a partitioned bioreactor. Other examples of secondary bioreactor use are easily envisioned by one of skill. One illustrative example is the growth and accumulation of a particular microorganism, or group of microorganisms, (as bacteria) in the second bioreactor, wherein the second bioreactor includes environmental conditions that are substantially different from the environmental conditions in the first bioreactor in order to systematically (i.e., continuously or in batches) feed the bacteria—in the mobile biofilm—as an augment to the population of the particular microorganism, or group of microorganisms, (as bacteria) that exist in the first bioreactor. This process is an example of bioaugmentation which, by definition, is the addition of bacterial cultures and necessary nutrients as required to expedite the rate of biological degradation of a contaminant and restore a depleted bacterial population or accumulate an excess amount of a specific type of microorganism (as bacteria) as a redundant supply. Bioaugmentation is useful in embodiments to add to the microorganism population, or to store a mobile biofilm supply in order to re-populate the first bioreactor with adequate mobile biofilm in the event of partial, or complete, loss of mobile biofilm from the first bioreactor, or both.

A third set of embodiments is directed to another treatment system. In the third set of embodiments, the bioreactor effluent is divided into a first bioreactor effluent and a second bioreactor effluent. A liquid-solid separation unit is adapted to receive the first bioreactor effluent. Various process mechanical, control and monitoring equipment are employed in various embodiments to control the flow of a stream of first bioreactor effluent to the liquid-solid separation unit according to processing principles well understood to those of skill. The liquid-solid separation unit separates the first bioreactor effluent into secondary effluent and underflow. The underflow includes the mobile biofilm in addition to other solids, wherein a portion of the underflow is returned to the bioreactor as return activated sludge, or RAS. Various process mechanical, control and monitoring equipment are employed in various embodiments to control the return of underflow to the bioreactor. In some embodiments, the secondary effluent is directed to a downstream unit process for further treatment or a pump station for conveyance.

A solid-solid separation unit is adapted to receive the second bioreactor effluent which may be withdrawn from any point in the bioreactor or a predetermined zone if the bioreactor is partitioned. The second bioreactor effluent withdraw point is defined by contaminated water quality and the treatment objective(s). Various process mechanical, control and monitoring equipment are employed in various embodiments to control the flow rate of second bioreactor effluent stream to the solid-solid separation unit according to processing principles well understood to those of skill. The solid-solid separation unit separates the mobile biofilm from other solids suspended in the second bioreactor effluent. Separated mobile biofilm is conveyed to the bioreactor influent or a pre-determined zone of a partitioned bioreactor. The remaining second bioreactor effluent includes waste activated sludge, or WAS, and other particulate matter. Various process mechanical, control and monitoring equipment are employed in various embodiments to control the return of the separated mobile biofilm to the bioreactor according to processing principles well understood to those of skill. In some embodiments, the WAS is conveyed to a solids management facility for further treatment prior to disposal. Otherwise, the WAS is subject to final disposal.

The third embodiment design allows for the apportionment of first and second bioreactor effluents such that the disposed amount of WAS versus the amount of RAS is easily adjusted to maintain a constant amount of suspended growth (a.k.a. activated sludge) within the bioreactor, while consistently returning a substantial portion of the mobile biofilm to the bioreactor.

It will be appreciated that in the third set of embodiments, a second bioreactor is advantageously employed in some embodiments thereof in the same manner as in the second set of embodiments. Thus, in such embodiments, a second bioreactor is disposed between the solid-solid separation unit and the bioreactor, and adapted to receive the separated mobile biofilm therefrom, wherein the second bioreactor further includes a secondary bioreactor influent as described in the second set of embodiments above.

Some treatment systems of the third set of embodiments further include a second bioreactor that is partitioned into two or more zones. The first zone of the partitioned second bioreactor receives both the secondary bioreactor influent and the separated mobile biofilm from the solid-solid separation unit. The second zone of the partitioned second bioreactor receives the WAS stream from the solid-solid separation unit, including suspended growth and other particulate matter. In this manner, the suspended growth from the WAS is conditioned to promote the growth of specific bacteria, for example ammonia oxidizing bacteria (or AOB). In some embodiments, rather than a single partitioned bioreactor, the third set of embodiments includes two or more additional bioreactors arranged in series. In some embodiments, the bacteria in the second zone of the partitioned second bioreactor are subjected to specific environmental conditions that cause the bacteria to release their internal storage products, such as phosphorus. Thus, a partitioned second bioreactor having two or more zones is disposed between the solid-solid separation unit and the first bioreactor, and adapted for a first zone to receive the separated mobile biofilm and a second zone to receive the WAS, or separated suspended growth and other particulate matter therefrom.

The treatment systems described herein include at least three components that work together in each embodiment described herein: a bioreactor, a mobile biofilm, and a solid-solid separation unit. The bioreactor and solid-solid separation unit are connected directly or indirectly and the mobile biofilm proceeds between the bioreactor and the solid-solid separation unit, wherein the mobile biofilm is repeatedly separated from the bioreactor effluent or the underflow, and is returned to the bioreactor. In some embodiments, two or more such cycles of use are realized by the mobile biofilm. For example, about 2 to 1,000,000,000 cycles of use are realized by the biofilm within the treatment systems, or about 10,000 to 100,000,000 cycles, or about 100,000 to 10,000,000 cycles, or about 1,000,000 to 10,000,000 cycles of use.

In some embodiments, the treatment systems described herein are employed in batch feed/withdrawal type systems; that is, as batch treatment systems. It will be appreciated that the benefits of employing a mobile biofilm component in conjunction with the ability of a solid-solid separation unit to separate and recycle the mobile biofilm from the bioreactor waste solids stream is also useful for batch feed/withdrawal processes for the treatment of contaminated water. However, continuous treatment systems are described herein in detail due to the large number of variations employed in such systems, and the utility such systems have in multiple environments.

Solid-solid separation units employed in the treatment systems described herein are conventional solid-solid separation units employed in the separation of particles that have a relatively narrow range of specific characteristics when compared with other particulate matter suspended in the stream being fed to the solid-solid separation unit, or solid-solid separation unit influent. In some embodiments, the solid-solid separation unit is a hydrocyclone. The skilled artisan will appreciate that the dimensions of a hydrocyclone are determined by the type and amount of solids to be separated, specifically the density differences between them, particle size differences due to the type of solids that arise from the contaminated water being treated, and characteristics such as particle size selected as the mobile biofilm substratum. Other examples are easily envisioned by one of skill, when employing a different type of solid-solid separation unit.

The mobile biofilms useful in the treatment systems described herein employ particles over a range of sizes, chemistries, and densities. The materials employed in the particles—in particular, the materials employed at the particle surface—most usefully have one or more of the following properties: durable to biodegradation conditions; pH resistant over pH values in the range 0 and 14; chemically resistant to expected water contaminants; and abrasion resistant. Useful particle sizes are not particularly limited; in some embodiments particle sizes range from about 500 nm to 5 mm in the largest dimension, or about 1 µm to 3 mm in the largest dimension, or about 2 µm to 2 mm in the largest dimension, or about 5 µm to 1 mm in the largest dimension. Smaller particle sizes provide higher surface area for biofilm growth, but are harder to separate both prior to and following the development of a biofilm that covers the substratum. In some embodiments, the particles are substantially spherical, while in other embodiments the particles are oblong, fibrous, irregularly shaped, or any other shape without limitation. In some embodiments, fibrous particulates having aspect ratios greater than about 25:1, for example about 50:1 to 1,000,000:1, or about 100:1 to 100,000:1 are less useful due to difficulty in separating such particulates using a solid-solid separation unit.

In some embodiments, the particles are formed from a thermoplastic or thermoset synthetic polymer. Useful polymeric materials include polyamides, polyesters, polyurethanes, polyolefins, polystyrene, polyacrylonitrile, polyvinylhalide polymers, polyvinylidene halide polymers, and the like, as well as copolymers, alloys, grafted or block copolymers, and blends thereof. In some embodiments, the particles are formed from naturally occurring polymers, such as cellulose, lignocellulose, and the like or grafted copolymers thereof with the synthetic polymers or copolymers listed herein. In still other embodiments, the particles are sand, or are formed from a glass or ceramic material such as silica glass, zeolite, titania, borosilicate, and the like. In still other embodiments, the particles are formed from metals or blends or alloys thereof such as titanium, stainless steel, and the like as well as polymer or glass coated metals. In still other embodiments, the particles are formed from or include carbon, such as carbon black, or activated carbon. In still other embodiments the particles are biological byproducts that are insoluble and generally not degradable in contaminated waters (i.e., granules).

In some embodiments, the density of the particles is further selected by the user to be greater than or less than the density of the subject liquid (e.g., water) to facilitate liquid-particle and/or particle-particle separation. While the density of pure water at 4° C. is 1.000 g/cm$^3$, the density of titanium is 4.506 g/cm$^3$; the density of silica is about 2.65 g/cm$^3$; the density of rigid polyvinylchloride is about 1.30 to 1.45 g/cm³; the density of polyurethanes ranges from about 1.01 to 1.20 g/cm³ depending on the particular structure; the density of polystyrene is about 0.96 to 1.04 g/cm³; the density of biological granules is about 1.00 to 1.05 g/L; the density of kenaf is about 0.91 to 1.13 g/cm³. Further, the inherent density of some materials is altered by modifying the structure of the particle itself. For example, in some embodiments where the particles are formed from a synthetic polymer, metal, or glass, the particle is suitably formed into a bubble particle. Bubble particles are characterized by a hollow interior portion. The ratio of bubble interior (air) volume to shell thickness together with the inherent density of the shell material determines the density of the bubble particle. Even where a high-density material, such as silica glass, is employed as the shell material, a bubble particulate having a density that is substantially lower than 1.00 g/cm³ is easily formed. For example, 3M® Co. of Maplewood, Min., sells glass bubbles having densities ranging from 0.30 g/cm³ to 0.69 g/cm³. It will be understood that the apparent density of the mobile biofilm is a function of both the substratum particle density and the density of the biofilm that is supported by the substratum.

In some embodiments, density differences between the mobile biofilm, the liquid stream, and the remaining undissolved, or suspended, solids (or particulates) are the basis for solid-solid separation. In such embodiments, wherein the mobile biofilm density is less than the density of the liquid stream carrying it, the solid-solid separation unit will separate the mobile biofilm in a manner wherein the mobile biofilm will exit the solid-solid separation unit with the top flow (or top portion). Where the density of the mobile biofilm is greater than the density of the liquid stream carrying it, the solid-solid separation unit will separate the mobile biofilm in a manner wherein the mobile biofilm will exit the solid-solid separation unit with the bottom flow (or bottom portion). The particulate is selected in each case to exit the solid-solid separation unit at the selected point and enter the selected flow stream in connection with the various embodiments set forth below; variations thereof as will be appreciated by one of skill.

In some embodiments, the mobile biofilms useful in the treatment systems described herein employ or use a substratum or carrier with characteristics that promote absorption of influent contaminants onto the surface of the biofilm substratum. For example, in one embodiment, the biofilm substratum has a net negative charge. Such a biofilm substratum absorbs contaminants, such as ammonia, with a net positive charge. During un-aerated phases, the biofilm substratum actively removes (absorbs) net positive charge contaminants, such as ammonia, because in un-aerated conditions, the nitrifiers, e.g., AOB's, in the biofilm are not active. Then, during aerobic conditions, net positive charge contaminants, such as ammonia, are directly metabolized by the AOB's. Advantageously, this reduces or avoids the mass transfer limitation placed on the biofilm in the liquid phase exterior to the biofilm surface.

In some embodiments, the above-described biofilm substratum is exposed to varying environmental conditions which promote the biological uptake of the absorbed influent contaminants. The environmental conditions include establishing one of aerobic conditions, anoxic conditions, or anaerobic conditions, or more than one of aerobic conditions, anoxic conditions, and anaerobic conditions. For example, in one embodiment, during an anaerobic phase, the influent contaminant, such as ammonia, is absorbed onto the biofilm substratum. The biofilm is exposed to environmental conditions where nitrite is available from the liquid phase, such as in an anoxic or aerobic zone. Such conditions promote the growth of Annamox bacteria because the bacteria metabolizes the absorbed contaminants (e.g., ammonia) and the nitrite from the liquid phase or from an AOB layer inside the biofilm.

Methods of Treatment

A fourth set of embodiments is directed to a method of treating contaminated water. In the fourth set of embodiments, a method of treating contaminated water includes adding a mobile biofilm to a bioreactor; establishing conditions in the bioreactor suitable for the biochemical transformation of one or more contaminants by microorganisms (as bacteria) in the mobile biofilm; adding a continuously flowing bioreactor influent to the bioreactor to produce a bioreactor effluent, the bioreactor effluent including the mobile biofilm, metabolized contaminants, and treated water; isolating at least a portion of the mobile biofilm from the bioreactor effluent; and returning the separated mobile biofilm to the bioreactor. Isolating is accomplished by the solid-solid separation unit. In some embodiments, isolating includes cyclonically isolating.

In some embodiments, the method further includes adding suspended growth to the bioreactor. In some embodiments, the method includes establishing one of aerobic conditions, anoxic conditions, or anaerobic conditions, or more than one of aerobic conditions, anoxic conditions, and anaerobic conditions inside a partitioned bioreactor or two or more single-stage or partitioned bioreactors in series. In some embodiments, the method further includes agitating the bioreactor content sufficiently to prevent settling or flotation of solids inside the bioreactor.

In some embodiments, after isolating the mobile biofilm from the remaining bioreactor effluent, the method further includes separating the remaining bioreactor effluent to form a secondary effluent and underflow. In other embodiments, the method further includes separating the bioreactor effluent to form a secondary effluent and underflow prior to isolating the mobile biofilm. In some such embodiments, the method includes partitioning the underflow into a first underflow portion and a second underflow portion, returning the first underflow portion to the bioreactor, separating the second underflow portion into a mobile biofilm portion and a remaining solids portion, and returning the separated mobile biofilm portion to the bioreactor. Thus, in such embodiments, the underflow is separated into two segments, return activated sludge and waste activated sludge. Return activated sludge is conveyed to a bioreactor influent. The waste activated sludge is conveyed to a solid-solid separation unit wherein at least a portion of the mobile biofilm is separated from other particulate matter in the segment of the underflow designated waste activated sludge rather than being separated from the bioreactor effluent. The separated mobile biofilm is returned to a bioreactor.

In some embodiments, the method includes dividing the bioreactor effluent into a first bioreactor effluent and second bioreactor effluent, isolating at least a portion of the mobile biofilm from the first bioreactor effluent and returning the isolated mobile biofilm to the bioreactor, separating the second bioreactor effluent into a secondary effluent and an underflow in a liquid-solid separation unit process, and returning the underflow to the bioreactor as return activated sludge.

In any of the fourth set of embodiments, the bioreactor is a first bioreactor and the bioreactor influent is a first bioreactor influent, and the method further includes passing the isolated mobile biofilm through a second bioreactor prior to returning the isolated biofilm to the first bioreactor, further wherein a secondary bioreactor influent is added to the second bioreactor and wherein the conditions in the second bioreactor are different from the conditions in the first bioreactor.

DETAILED DESCRIPTION OF THE FIGURES

FIG. 1 shows treatment system 100 including bioreactor 110 having mobile biofilm 120, solid-solid separation unit 130, and liquid-solid separation unit 140. Bioreactor 110 includes diffusers 112, inlet 114, and outlet 116. Bioreactor influent enters bioreactor 110 via inlet 114 where it is subjected to aerobic conditions due to dissolved oxygen resulting from air flowing through diffusers 112. Mobile biofilm 120 is evenly distributed throughout bioreactor 110. As bioreactor influent flows through bioreactor 110 in a direction generally from inlet 114 toward outlet 116, one or more contaminants present in the bioreactor influent are converted to biomass and other reaction by-products through biochemical transformation processes with the combined action of dissolved oxygen available in the air that is flowing through the diffusers 112, dissolved and particulate contaminants in the bioreactor influent, and mobile biofilm 120. As the influent reaches outlet 116 it becomes bioreactor effluent. The bioreactor effluent includes at least particulate matter resulting from the biochemical transformation processes, other dissolved and particulate materials, treated water, and mobile biofilm; the solid matter resulting from biochemical transformation includes detached biofilm fragments, and organic and inorganic particulate materials bound in the detached biofilm fragments and suspended in the effluent stream.

The bioreactor effluent is sent to solid-solid separation unit 130. In this embodiment, solid-solid separation unit 130 is a hydrocyclone; however, one of skill will appreciate that other solid-solid separation units are similarly useful in various embodiments herein and without limitation. Solid-solid separation unit 130 has first outlet 132 leading separated mobile biofilm through the reintroduction inlet 134 to bioreactor 110; and second outlet 136 leading to liquid-solid separation unit inlet 138. Action of solid-solid separation unit 130 provides a separated stream of output including first outlet 132 stream and second outlet 136 stream. First outlet 132 stream includes mobile biofilm 120 and a portion of the treated water that is substantially separated from the remainder of the bioreactor effluent; first outlet 132 stream includes mobile biofilm 120 that is returned to bioreactor 110 via reintroduction inlet 134 to bioreactor inlet 114. The stream from second outlet 136 travels through liquid-solid separation unit inlet 138 to liquid-solid separation unit 140. In the particular embodiment shown, liquid-solid separation unit 140 is a sedimentation basin (or secondary clarifier); however, it will be appreciated that other liquid-solid separation units are employed in various embodiments herein without limitation. Liquid-solid separation unit 140 includes weir 142, secondary effluent outlet 144, and underflow outlet 146. Solid-solid separation unit second outlet 136 stream enters liquid-solid separation unit 140 where gravity acts on the solid matter to cause solids to settle toward the bottom of liquid-solid separation unit 140 creating compacted solids known as underflow, whereupon the underflow exits liquid-solid separation unit 140 at liquid-solid separation unit outlet 146. The continuous flow of bioreactor effluent through solid-solid separation unit outlet 136 causes secondary effluent to pass over weir 142 and exit secondary effluent outlet 144. Secondary effluent exiting outlets 144 and 146 are isolated for disposal or subsequent treatments employing conventional technologies.

Figure 2:
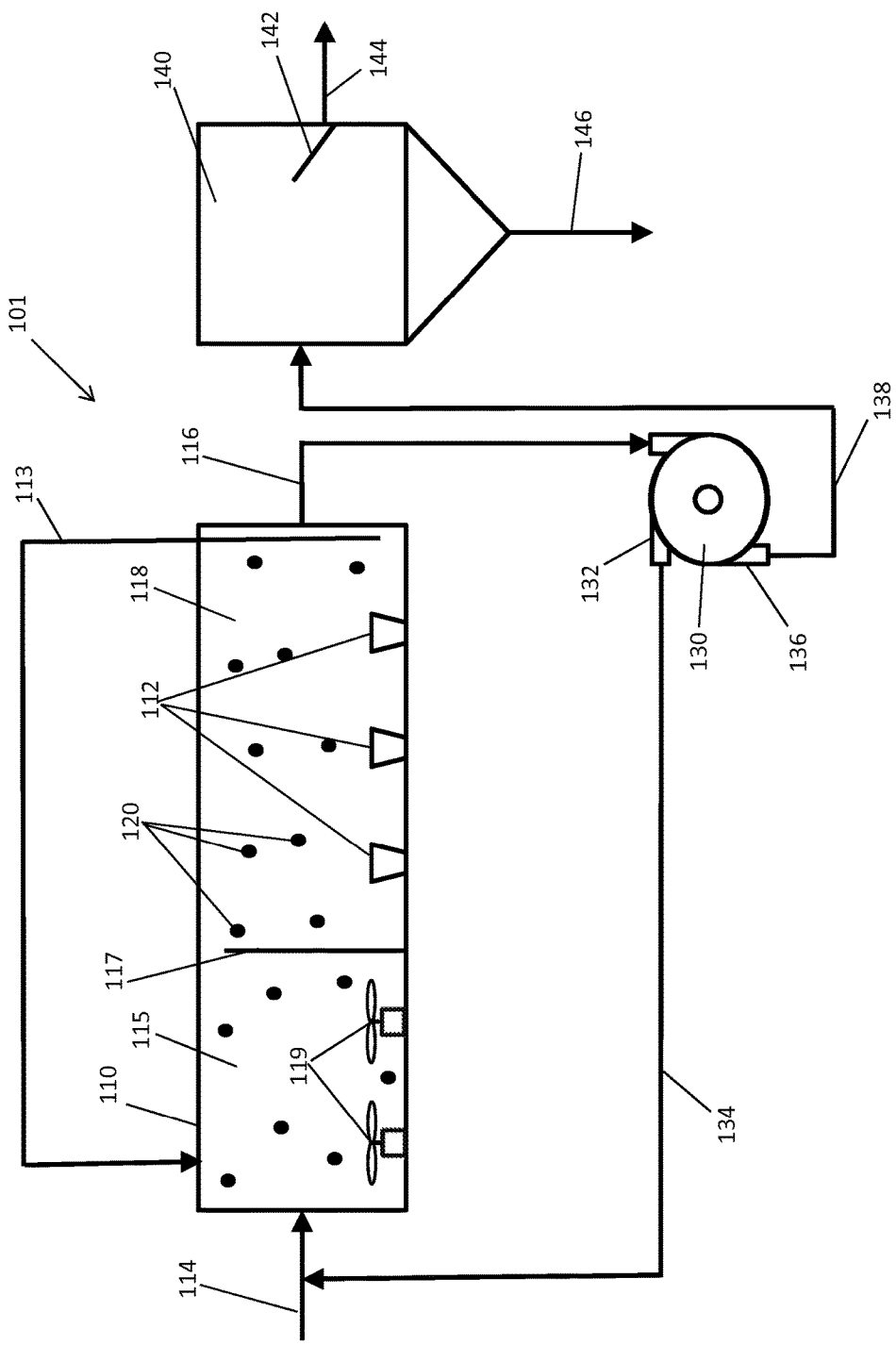
FIG. 2 is a schematic view of another embodiment of a treatment system of the invention.

FIG. 2 shows treatment system 101 which is similar to treatment system 100, except that treatment system 101 is partitioned into two zones. The first zone is anoxic zone 115 and the second zone is aerobic zone 118. Anoxic zone 115 and aerobic zone 118 are separated by partition wall 117. Anoxic zone 115 includes agitators 119, and is characterized by lack of diffusers 112. Agitators 119 prevent clumping and settling/flotation of the mobile biofilm 120, maintaining a large surface area within the anoxic zone 115 and assuring consistent flow through the treatment system to bioreactor effluent outlet 116. Bioreactor influent enters bioreactor 110 via inlet 114, where it is subjected to aerobic conditions via air flowing into aerobic zone 118 through diffusers 112. Mobile biofilm 120 is evenly distributed throughout bioreactor 110. As bioreactor influent flows through bioreactor 110 in a direction generally from bioreactor influent inlet 114 toward bioreactor effluent outlet 116, one or more contaminants present in the bioreactor influent are converted to biomass and other reaction by-products through biochemical transformation processes with the combined action of an anoxic environment, oxygen available in the air that is flowing through the diffusers 112 in aerobic zone 118, mobile biofilm 120, and an internal recirculation stream 113. The internal recirculation stream 113 conveys water laden with reaction by-products that are otherwise unavailable in the bioreactor influent; thereby, these reaction by-products, for example nitrate/nitrite-nitrogen ($NO_x$—N), react with organic matter in the bioreactor influent to remove the oxidized nitrogenous compounds from the contaminated water. As the bioreactor influent, including mobile biofilm 120, reaches the partition wall 117 it flows over the partition wall 117 into aerobic zone 118. As influent continues to flow toward bioreactor effluent outlet 116, the bioreactor influent is further subjected to biochemical transformation processes by the action of bacteria that grow in the mobile biofilm 120 under aerobic conditions.

Figure 3:
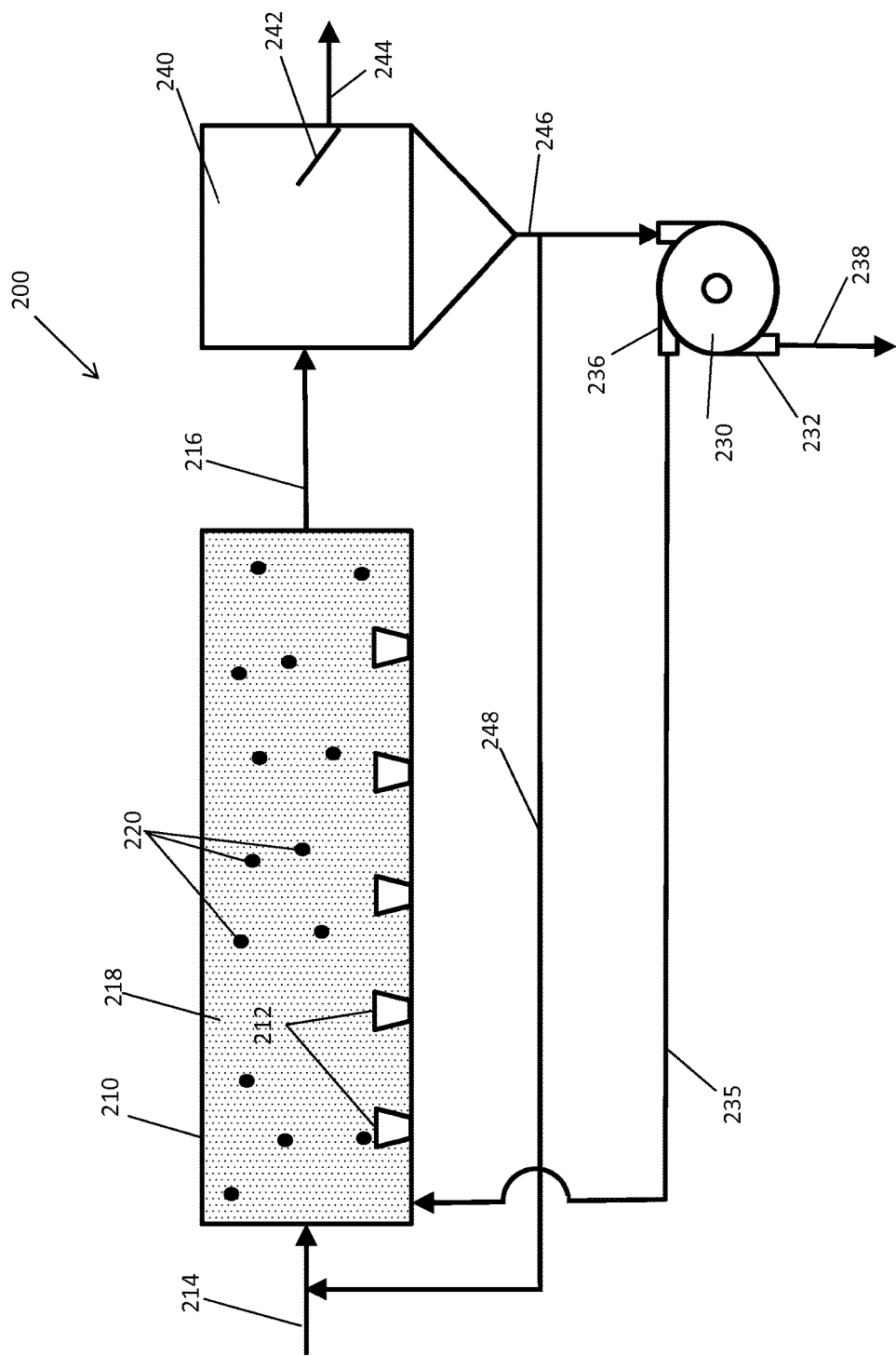
FIG. 3 is a schematic view of yet another embodiment of a treatment system of the invention.

FIG. 3 shows treatment system 200 including bioreactor 210, liquid-solid separation unit 240, and solid-solid separation unit 230. Bioreactor 210 includes diffusers 212, bioreactor influent inlet 214, and bioreactor effluent outlet 216. Bioreactor influent enters bioreactor 210 via bioreactor influent inlet 214 where it is subjected to aerobic conditions by air flowing through diffusers 212. Mobile biofilm 220 and suspended growth 218 are substantially evenly distributed throughout bioreactor 210. As bioreactor influent flows through bioreactor 210 in a direction generally from bioreactor influent inlet 214 toward bioreactor effluent outlet 216, one or more contaminants present in the bioreactor influent are converted to biomass and other reaction by-products through biochemical transformation processes with the combined action of dissolved oxygen available in the air that is flowing through the diffusers 212, suspended growth 218, and mobile biofilm 220. As the bioreactor influent reaches bioreactor effluent outlet 216 it becomes bioreactor effluent. The bioreactor effluent that exits bioreactor effluent outlet 216 includes at least solid matter resulting from biochemical transformations, other dissolved and particulate materials, treated water, suspended growth 218, and mobile biofilm 220. The solid matter resulting from biochemical transformation includes detached biofilm fragments, suspended growth, organic and inorganic particulate materials suspended in the effluent stream, and organic and inorganic particulate materials bound in the detached biofilm fragments and suspended growth.

The bioreactor effluent exits bioreactor effluent outlet 216 and enters liquid-solid separation unit 240. In this embodiment, liquid-solid separation unit 240 is a sedimentation basin; however, one of skill will appreciate that other separation units are similarly useful in various embodiments herein and without limitation. Inside liquid-solid separation unit 240, gravity causes the detached biofilm fragments, suspended growth 218, and mobile biofilm 220 to settle toward the bottom of liquid-solid separation unit 240. The compacted particulate matter becomes underflow that exits liquid-solid separation unit 240 through liquid-solid separation unit outlet 246. The continuous flow of bioreactor effluent through bioreactor effluent outlet 216 causes secondary effluent to pass over weir 242 and exit secondary effluent outlet 244. Secondary effluent outlet 244 is isolated for disposal or other final treatments employing conventional technologies.

Liquid-solid separation underflow outlet 246 is divided into two streams. The first underflow stream is return activated sludge that is directed to the bioreactor through return activated sludge inlet 248. The second underflow stream enters solid-solid separation unit 230. In this embodiment, solid-solid separation unit 230 is a hydrocyclone; however, one of skill will appreciate that other solid-solid separation units are similarly useful in various embodiments herein and without limitation. Solid-solid separation unit 230 has first outlet 232 that allows waste activated sludge, to be disposed of or directed to other final treatments employing conventional technologies, as represented by output stream 238. Solid-solid separation unit 230 also has second outlet 236 leading to reintroduction inlet 235 that returns the separated mobile biofilm to bioreactor 210. Action of solid-solid separation unit 230 on the underflow stream from underflow outlet 246 separates the stream into first outlet 232 stream and second outlet 236 stream based on the target density and size of the mobile biofilm 220 that is to be separated from suspended growth 218 and other particulate matter suspended in the underflow that is exiting liquid-solid separation unit 240 through liquid-solid separation unit outlet 246. Solid-solid separation unit second outlet 236 stream contains mobile biofilm 220 and a portion of treated water substantially separated from the remainder of the underflow; solid-solid separation unit second outlet 236 stream containing mobile biofilm 220 is returned to bioreactor 210 via reintroduction inlet 235. Waste activated sludge flowing through the solid-solid separation unit first outlet 232 stream is isolated for disposal or other final treatments employing conventional technologies.

It will be appreciated that the amount of underflow exiting liquid-solid separation unit outlet 246 that is directed back into the bioreactor 210 through return activated sludge inlet 248 is set to maintain a pre-defined volumetric flow rate, but the difference in volumetric flow rate as underflow and return activated sludge is selected based on the amount of waste activated sludge discharged from the system.

In some embodiments, the bioreactor of FIG. 3 is partitioned into two or more zones. Additionally, in some embodiments, the bioreactor functions as a continuous flow stirred tank reactor, or series thereof. Additionally, in some embodiments, the bioreactor functions as a plug flow reactor, or series thereof. Additionally, in some embodiments, the bioreactor functions as a batch reactor, or series thereof. Additionally, in some embodiments, the bioreactor is subject to anoxic or anaerobic conditions inside the bioreactor (or bioreactor zone) instead of aerobic conditions. Aerobic bioreactors receive air inflow through diffusers anchored to the tank bottom. The air flowing through these diffusers provides the dissolved oxygen required to satisfy process requirements and evenly distribute contents throughout the bioreactor bulk-liquid volume. Anaerobic and anoxic bioreactors require an agitator such as a propeller, impeller, and the like to evenly distribute contents throughout the bioreactor bulk-liquid volume without introducing dissolved oxygen that would severely inhibit the biochemical transformation processes that require an anoxic or anaerobic environment.

Figure 4:
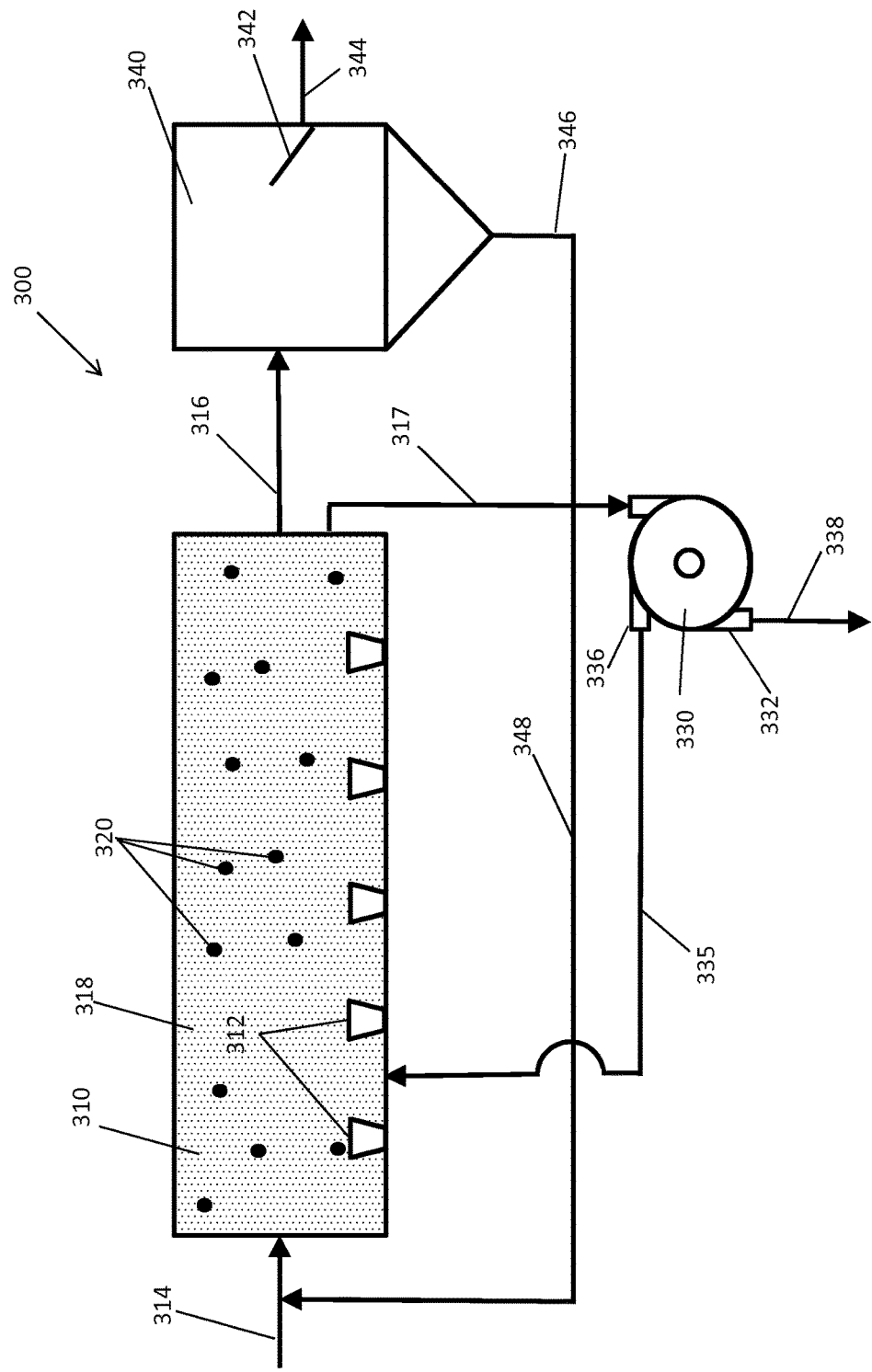
FIG. 4 is a schematic view of yet another embodiment of a treatment system of the invention.

FIG. 4 shows treatment system 300 including bioreactor 310, liquid-solid separation unit 340, and solid-solid separation unit 330. Bioreactor 310 includes diffusers 312, bioreactor influent inlet 314, first bioreactor effluent outlet 316, and second bioreactor effluent outlet 317. Bioreactor influent enters bioreactor 310 via bioreactor influent inlet 314, where it is subjected to aerobic conditions via diffusers 312. Mobile biofilm 320 and suspended growth 318 are substantially evenly distributed throughout the bulk-liquid in bioreactor 310. As bioreactor influent flows through bioreactor 310 in a direction generally from bioreactor influent inlet 314 toward first bioreactor effluent outlet 316, contaminants and macronutrients in the bioreactor influent are biochemically transformed by the combined action of dissolved oxygen provided by air flowing through diffusers 312, mobile biofilm 320, and suspended growth 318. As the bioreactor influent reaches bioreactor effluent outlet 316 it becomes bioreactor effluent. The bioreactor effluent that exits bioreactor effluent outlets 316 and 317 includes at least particulate matter resulting from biochemical transformation processes occurring in bioreactor 310, other dissolved and particulate materials, treated water, suspended growth 318, and mobile biofilm 320; the particulate matter resulting from biochemical transformation processes occurring in bioreactor 310 includes detached biofilm fragments, suspended growth 318, and organic and inorganic particulate materials suspended in the bioreactor effluent 316, 317 and bound in the detached biofilm fragments and suspended growth.

A first portion of the bioreactor effluent exits first bioreactor effluent outlet 316 and enters liquid-solid separation unit 340. Again, the liquid-solid separation unit 340 shown is a sedimentation basin (or secondary clarifier), but another device for liquid-solid separation is also suitably used without limitation. Inside liquid-solid separation unit 340, gravity causes the first portion of bioreactor effluent to separate into secondary effluent and underflow, wherein the underflow includes at least suspended growth 318 and mobile biofilm 320. The underflow exits liquid-solid separation unit 340 through liquid-solid separation unit outlet 346 and is returned to bioreactor 310 via bioreactor influent inlet 314. Bioreactor effluent from first bioreactor effluent outlet 316 flows into liquid-solid separation unit 340 causing secondary effluent to pass over weir 342 and exit via secondary effluent outlet 344. Secondary effluent exiting secondary effluent outlet 344 is isolated for disposal or other final treatments employing conventional technologies.

A second portion of the bioreactor effluent exits second bioreactor effluent outlet 317 and enters solid-solid separation unit 330. Again, in this embodiment, solid-solid separation unit 330 is a hydrocyclone; however, one of skill will appreciate that other solid-solid separation units are similarly useful in various embodiments herein and without limitation. The point from which second bioreactor effluent outlet 317 is located in the bioreactor is selected based on factors such as contaminated water quality and treatment objectives. In some embodiments, the bioreactor is partitioned, such as in embodiments described above, and the second bioreactor effluent outlet 317 is located in a predetermined zone based on the nature of the partitioning, contaminated water quality, and treatment objectives. Solid-solid separation unit 330 has first outlet 332 and second outlet 336. Action of solid-solid separation unit 330 provides first outlet 332 that includes solid-solid separation unit output including a substantial portion of suspended growth and other particulate matter, and second outlet 336 that includes solid-solid separation unit output including a substantial portion of separated mobile biofilm 320. Mobile biofilm 320 is dispensed from solid-solid separation unit 330 at second outlet 336 and is returned to bioreactor 310 via reintroduction inlet 335. The point at which reintroduction inlet 335 is located in the bioreactor is selected based on factors such as contaminated water quality and treatment objectives. In some embodiments, the bioreactor is partitioned, such as in embodiments described above, and the reintroduction inlet 335 is located in a predetermined zone based on the nature of the partitioning, contaminated water quality, and treatment objectives. The remaining materials from the second portion of the bioreactor effluent are dispensed from solid-solid separation unit 330 at first outlet 332 and are isolated for disposal or other final treatments employing conventional technologies.

In some embodiments, bioreactor effluent outlets 316 and 317 are combined into a single outlet that is partitioned, wherein the flow is apportioned between the split paths into solid-solid separation unit 330 and liquid-solid separation unit 340 in order to control the amount of recycled separated solids versus the disposed solids. In both this scenario and the dual outlet scenario, the amount of solid waste disposed is easily controlled while the mobile biofilm 320 is reliably and controllably recycled within the system.

The solid-solid separation unit efficiency in separating mobile biofilm from other solids in a system of any configuration substantially as described in any of the embodiments herein is about 50% to 99.9999% based on the number and particular characteristics of particles residing in the system at any given time. In some embodiments, the solid-solid separation unit efficiency in separating the mobile biofilm from other solids is about 60% to 99.9999%, or about 70% to 99.999%, or about 80% to 99.999% or about 90% to 99%, or about 95% to 99.9%, or about 98% to 99.99% based on the number of particles residing in the system at any given time. The consequence of liquid-solid separation unit process and solid-solid separation unit efficiency in separating the mobile biofilm from other solid material within the contaminated water treatment system being less than 100% is that the mobile biofilm, or mobile biofilm substratum, must be replaced over time. Replacement mobile biofilm, or mobile biofilm substratum, are added to the system to replace lost mobile biofilm, or mobile biofilm substratum. In some embodiments, the efficiency of mobile biofilm separation from other particles in the solid-solid separation unit is selected by the system designer for optimal efficiency, cost effectiveness, or other criteria.

In some embodiments, replacement particles are added to replenish lost mobile biofilm that exits the system with the secondary effluent or other portions lost or separated from the contaminated water treatment system. Other factors that affect the need to replace the mobile biofilm, or mobile biofilm substratum, include physical damage, biodegradation, chemical degradation, or attrition of the substratum otherwise. In some embodiments, mobile biofilm substratum is continuously added to the contaminated water treatment system at a rate that is equal to the rate of mobile biofilm attrition (from the contaminated water treatment system). In other embodiments, mobile biofilm substratum is added periodically, that is, batchwise. Periodic additions are carried out, in embodiments, at intervals that do not result in the contaminated water treatment system performance deterioration. In this manner, the system is constantly and consistently able to meet the treatment objectives. In still other embodiments, the bioreactor is a first bioreactor and an additional portion of mobile biofilm substratum is subjected to growth conditions in a second bioreactor that promotes the growth of mobile biofilm. The mobile biofilm in the second bioreactor is capable of meeting the contaminated water treatment system treatment objectives. The mobile biofilm in the second bioreactor is directed to the first bioreactor (i.e., contaminated water treatment system), in embodiments at a rate that is equal to the rate of mobile biofilm attrition.

Additional embodiments suitably employed in conjunction with the treatment systems described above include using a secondary bioreactor, or bioreactors, placed immediately downstream of a solid-solid separation unit outlet, or outlets. For example, in any of the embodiments shown in FIGS. 1-4, the bioreactor is a first bioreactor and a second bioreactor is suitably placed in line, for example, with reintroduction inlet 134 in FIG. 1 or 2, or in line with reintroduction inlet 235 of FIG. 3, or in line with reintroduction inlet 335 of FIG. 4. By incorporating a second bioreactor in between the solid-solid separation unit outlet(s) and the first bioreactor, waste streams having characteristics different than the primary bioreactor influent stream can be fed into the second bioreactor, the second bioreactor having environmental conditions uniquely established to grow a specific microorganism, or group of microorganisms (as bacteria). This specific microorganism, or group of microorganisms, (as bacteria) is then used for treatment of the contaminated water stream being fed to the secondary bioreactor and/or fed to the first bioreactor to achieve a mechanism of contaminated water treatment that would not otherwise be possible in only the first bioreactor. In some embodiments, the specific microorganism, or group of microorganisms, (as bacteria) grows in an aerobic, anoxic, or anaerobic environment. In other embodiments, it requires an alternating environment such as cyclic aerobic and anaerobic conditions for predefined periods.

In one such embodiment, anaerobic ammonia oxidizing, or Anammox, bacteria may accumulate in a mobile biofilm employed within a secondary bioreactor placed in line with a contaminated water treatment system as described in first, second, or third embodiments above. Anammox bacteria will not accumulate in contaminated water treatment systems that accumulate nitrite oxidizing bacteria, or NOB, which are a common bacterial species found in nitrifying biofilm and activated sludge processes. It is an advantage of the present invention that the use of mobile biofilms having a judiciously selected particle size and density and coupled with proper solid-solid separation unit dimensions are usefully connected to receive the output from bioreactors having suspended growth combined with mobile biofilm, and are capable of delivering mobile biofilm free of suspended growth to a secondary bioreactor to promote the accumulation of a specific microorganism, or group of microorganisms, (as bacteria) such as the Anammox bacteria. In this manner, a compact and efficient system capable of treating water streams contaminated with both organic waste and nitrogenous compounds is provided.

Figure 5:
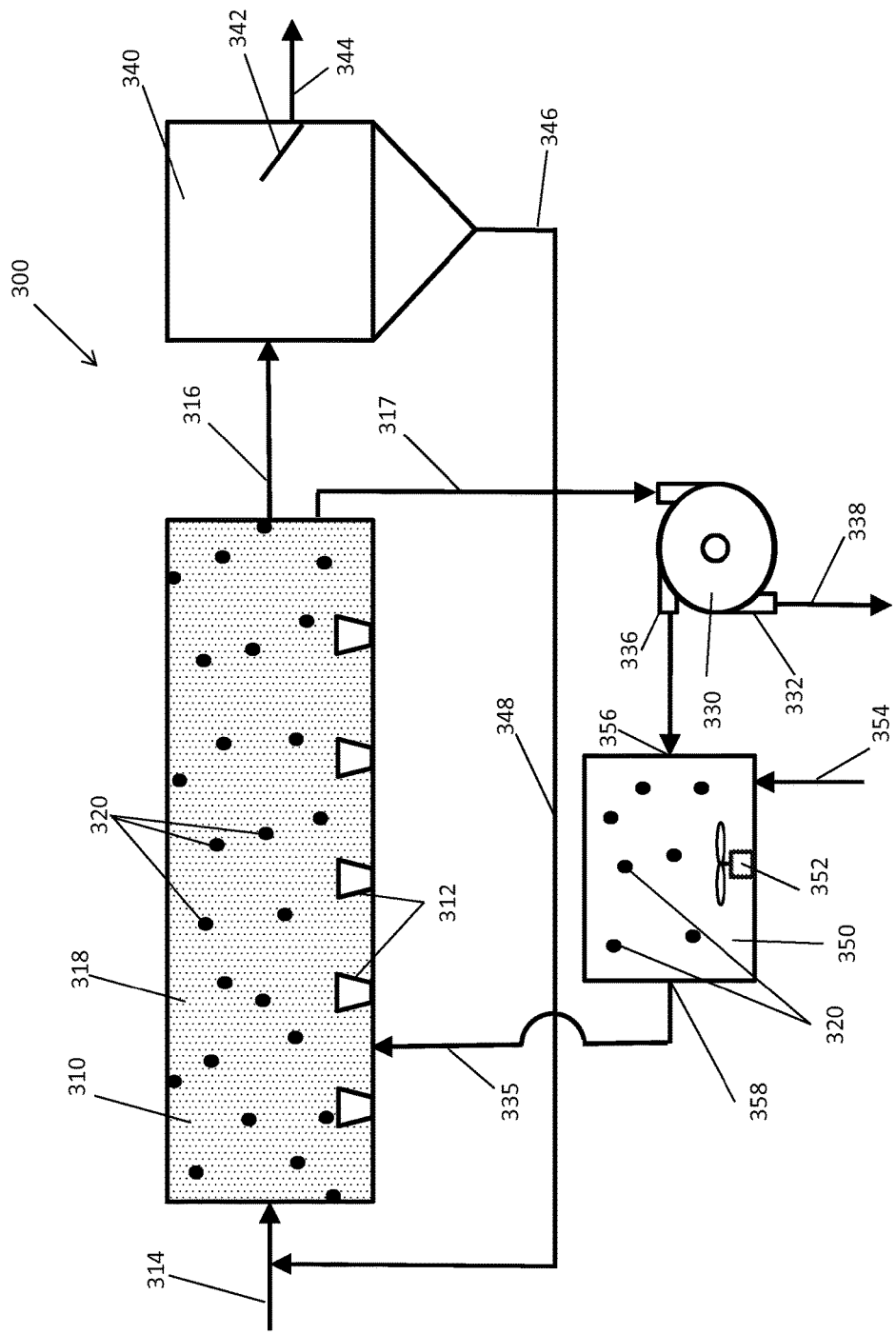
FIG. 5 is a schematic view of yet another embodiment of a treatment system of the invention.

FIG. 5 shows the treatment system illustrated as FIG. 4, with the addition of second bioreactor 350 placed in line with reintroduction inlet 335, in fluid communication with solid-solid separation unit 330 second outlet 336 (which contains the separated mobile biofilm) and bioreactor 310, which is the first bioreactor 310 in the embodiment of FIG. 5. Second bioreactor 350 includes mobile biofilm 320, agitator 352, first inlet 354, second inlet 356, and outlet 358. Second bioreactor 350 is characterized by the substantial absence of suspended growth 318. Process oxygen requirements and the substantially even distribution of mobile biofilm throughout the bioreactor is accomplished with agitator/aerator 352. A secondary influent flows into the second bioreactor through first inlet 354 at a rate that is the greater than, the same as, or less than the rate of primary bioreactor influent entering first bioreactor 310 through bioreactor influent inlet 314. The secondary influent source is the same influent source as the bioreactor influent source entering first bioreactor 310 via bioreactor influent inlet 314, or it is a different influent source. Mobile biofilm 320 enters second bioreactor 350 via second inlet 356 from second outlet 336 of solid-solid separation unit 330. The secondary bioreactor influent is subjected to aerobic, anoxic, anaerobic, or cyclical conditions in the presence of mobile biofilm 320. Mobile biofilm 320 is substantially uniformly distributed throughout second bioreactor 350 by aerator/agitator 352. As the secondary bioreactor influent flows through second bioreactor 350 in a direction generally from first inlet 356 toward outlet 358, the secondary bioreactor influent becomes secondary bioreactor effluent following the biochemical transformation processes supported within second bioreactor 350. The secondary bioreactor effluent, containing mobile biofilm 320, is reintroduced to first bioreactor 310 via reintroduction inlet 335.

Alternatively, in FIG. 5 set forth above, the location of reintroduction inlet 335 is selected based on the properties of the influent stream and ultimate treatment objectives. Thus, for example, in some embodiments reintroduction inlet 335 is suitably disposed in fluid connection with bioreactor influent inlet 314 rather than with bioreactor 310 directly; various positions for reintroduction inlet 335 are further envisioned as within the scope of the systems employed throughout this disclosure.

In another alternative to FIG. 5, bioreactor 310 is partitioned into two or more zones, and the location of reintroduction inlet 335 is selected to flow into one of the zones based on treatment objectives, contaminated water quality, and other considerations that may be envisioned by one of skill.

In FIG. 5, the second bioreactor influent is subjected to aerobic, anoxic, and/or anaerobic conditions, or cyclic aerobic-anoxic conditions as selected by the user. For example, in some embodiments, the second bioreactor includes both a diffuser to maintain a very low dissolved oxygen concentration and an agitator to ensure substantially uniform distribution of all solids within the bioreactor.

Figure 6:
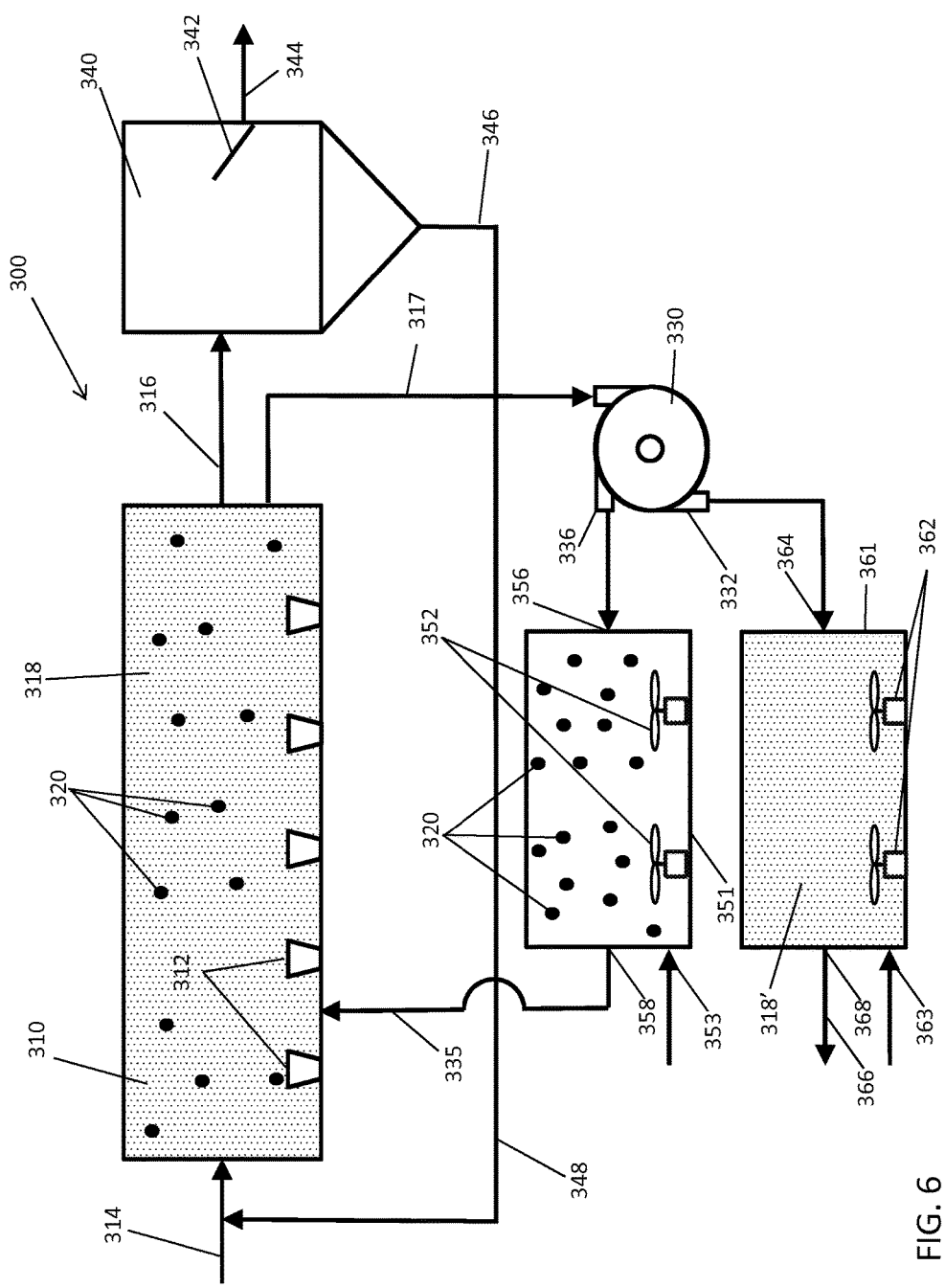
FIG. 6 is a schematic view of yet another embodiment of a treatment system of the invention.

FIG. 6 shows another alternative embodiment of FIG. 5. In FIG. 6, a second bioreactor 351 is placed immediately down stream of solid-solid separation unit 330 in line with reintroduction inlet 335, in fluid communication with solid-solid separation unit second outlet 336 (which directs separated mobile biofilm), and ultimately redirects its contents to first bioreactor 310. The point at which the contents of second bioreactor 351 are introduced to first bioreactor 310 through reintroduction inlet 335 is determined by the treatment objectives, contaminated water quality, and other considerations that may be envisioned by one of skill. Second bioreactor 351 includes mobile biofilm 320, aerators/agitators 352, first inlet 356, second inlet 353, and outlet 358. Second bioreactor 351 is characterized by the absence of substantial suspended growth 318. A secondary bioreactor influent source enters through first inlet 353 at a rate that is the greater than, the same as, or less than the rate of bioreactor influent entering first bioreactor 310 through bioreactor influent inlet 314. The secondary influent source is the same influent source as the bioreactor influent source entering bioreactor 310 via bioreactor influent inlet 314, or it is a different influent source. Mobile biofilm 320 enters second bioreactor 351 via first inlet 356 from solid-solid separation unit first outlet 336. The secondary bioreactor influent is subjected to aerobic, anoxic, and/or anaerobic conditions in the presence of mobile biofilm 320 that is substantially uniformly distributed throughout second bioreactor 351. As the secondary bioreactor influent flows through second bioreactor 351 in a direction generally from first inlet 356 toward outlet 358 the influent becomes secondary bioreactor effluent through biochemical transformation processes supported within second bioreactor 351. The secondary bioreactor effluent, containing mobile biofilm 320, is reintroduced to first bioreactor 310 via reintroduction inlet 335.

In an alternative embodiment of FIG. 6, first bioreactor 310 is partitioned. In such an embodiment, the zone to which the contents of second bioreactor 351 are introduced to first bioreactor 310 through reintroduction inlet 335 is determined by the treatment objectives, contaminated water quality, and other considerations envisioned by one of skill FIG. 6 further shows third bioreactor 361 located down stream of solid-solid separation unit 330 in fluid communication with solid-solid separation unit second outlet 332 that includes suspended growth 318 and other particulate material, but is substantially separated from mobile biofilm 320. Third bioreactor 361 includes suspended growth 318', aerators/agitators 362, first inlet 364, second inlet 363, and outlet 368. Suspended growth 318' is the same as, or is different from, the suspended growth 318, depending on environmental conditions within third bioreactor 361. Third bioreactor 361 is characterized by the substantial absence of mobile biofilm disposed therein. A tertiary bioreactor influent source enters through second inlet 363 at a selected rate that is the greater than, the same as, or less than the rate of primary bioreactor influent entering first bioreactor 310. Tertiary influent source flowing through third bioreactor second inlet 363 is the same as primary influent source entering first bioreactor 310, or is the same as secondary bioreactor influent source entering second bioreactor 351, or it is a different influent source from either the primary or secondary influent sources.

Suspended growth 318' enters third bioreactor 361 through first inlet 364 from solid-solid separation unit second outlet 332. The third bioreactor influent is also subjected to aerobic, anoxic, and/or anaerobic conditions (e.g., static or cyclic aerobic-anoxic conditions) as selected in the presence of suspended growth that is substantially uniformly distributed throughout secondary bioreactor 361; thus, in some embodiments, a source of oxygen is further provided within third bioreactor 361. As the tertiary bioreactor influent flows through third bioreactor 361 in a direction generally from first inlet 364 toward outlet 368 the tertiary influent becomes tertiary bioreactor effluent through biochemical transformation processes supported within third bioreactor 361. The tertiary bioreactor effluent, containing suspended growth 318', is disposed of or conveyed to solids management facilities with known technologies that adjoin with suspended growth outlet 366.

An example application of the alternative embodiment illustrated by FIG. 6 is useful, for example, in conjunction with processes described in U.S. Pat. No. 7,604,740, wherein the selective release of phosphorus and magnesium prior to sludge treatment is carried out by having a characteristic stream, in this embodiment provided by second inlet 363 of the third bioreactor 361, that is enriched with volatile fatty acids. The third bioreactor inlet 364 receives suspended growth from solid-solid separation unit second outlet 332, which contains suspended growth 318, other particulate material, and is substantially free of mobile biofilm. In this example embodiment, third bioreactor 361 operates under anaerobic conditions in which suspended growth 318' has internal magnesium and phosphorus storage reservoirs released into bioreactor 361 as a result of endogenous respiration or the metabolic processes therein. Thus, output exiting third bioreactor 361 via outlet 368 is characterized by elevated phosphorus and magnesium concentrations. The excess phosphorus and magnesium remaining in waste activated sludge outlet 366 may be subjected to methods to recover the magnesium and/or phosphorus released in the third bioreactor 361 as chemical nutrient products or as applied to biological wastewater treatment units requiring the magnesium and/or phosphorus for wastewater and/or sludge treatment. In this and related systems substantially as disclosed herein, it will be appreciated that any contaminated water treatment methods requiring magnesium and phosphorus for treatment purposes will benefit from such third bioreactor inclusion.

One of skill will appreciate that other specialized systems and variations thereof including additional specialized bioreactors and treatment systems customized for specialized treatment scenarios are easily implemented employing the general principles set forth in conjunction with any of the other embodiments described herein. For example, in embodiments, multiple mobile biofilm-based bioreactors are implemented in fluid connection in a single treatment system by judicious splitting of influent and/or effluent streams. In another example, the secondary bioreactor is a second aerobic bioreactor. In yet another example, bioreactor 310 of FIG. 5 is an anaerobic bioreactor and secondary bioreactor 350 is an aerobic bioreactor. One of skill can easily envision many additional examples.

The invention illustratively disclosed herein can be suitably practiced in the absence of any element which is not specifically disclosed herein. While the invention is susceptible to various modifications and alternative forms, specifics thereof have been shown by way of examples, and are described in detail. It should be understood, however, that the invention is not limited to the particular embodiments described. On the contrary, the intention is to cover modifications, equivalents, and alternatives falling within the spirit and scope of the invention. Additionally each and every embodiment of the invention, as described here, is intended to be used either alone or in combination with any other embodiment described herein as well as modifications, equivalents, and alternatives thereof falling within the spirit and scope of the invention.

In various embodiments, the invention suitably comprises, consists essentially of, or consists of the elements described herein and claimed according to the claims.

The invention claimed is:

1. A treatment system comprising
a first bioreactor comprising an inlet adapted to receive a first bioreactor influent having one or more contaminants, a first bioreactor effluent first outlet adapted to dispense a first portion of bioreactor effluent from the first bioreactor and a first bioreactor effluent second outlet adapted to dispense a second portion of bioreactor effluent from the first bioreactor, the second portion of bioreactor effluent comprising a mobile biofilm;
a liquid-solid separation unit in direct fluid communication with the first bioreactor effluent first outlet;
a solid-solid separation unit in direct fluid communication with the first bioreactor effluent second outlet of the first bioreactor and adapted to receive and separate the second portion of bioreactor effluent into a stream comprising mobile biofilm and a stream comprising residual solids, the solid-solid separation unit including an outlet for returning the stream comprising the mobile biofilm to the first bioreactor;
a second bioreactor disposed in fluid communication between the first bioreactor and the outlet of the solid-solid separation unit, the second bioreactor having a first inlet for receiving the stream comprising mobile biofilm from the solid-solid separation unit, a second inlet for receiving a second bioreactor influent, and an outlet for dispensing a second effluent to the first bioreactor.

2. The treatment system of claim 1 wherein the first bioreactor, in operation, maintains aerobic conditions, anoxic conditions, anaerobic conditions, or a combination of two or more thereof.

3. The treatment system of claim 1 further comprising another liquid-solid separation unit adapted to receive the stream comprising residual solids from the solid-solid separation unit and further separate the stream comprising residual solids into a secondary effluent and an underflow.

4. The treatment system of claim 1 wherein the solid-solid separation unit comprises a hydrocyclone.

5. The treatment system of claim 1 wherein the mobile biofilm comprises lignocellulosic particles, biological granules, or a combination thereof.

6. The treatment system of claim 1 wherein the mobile biofilm comprises a characteristic that promotes absorption of an influent contaminant.

7. The treatment system of claim 6 wherein the characteristic is net negative charge.

8. The treatment system of claim 7 wherein the influent contaminant has a net positive charge.

9. The treatment system of claim 8 wherein the influent contaminant is ammonia.

10. The treatment system of claim 6 wherein the first bioreactor, in operation, maintains aerobic conditions, anoxic conditions, anaerobic conditions, or a combination of two or more thereof.

11. The treatment system of claim 1 wherein the stream comprising mobile biofilm comprises between 50% and 100% of the mobile biofilm present in the second portion of bioreactor effluent received by the solid-solid separation unit.

12. The treatment system of claim 1 wherein a source of the first bioreactor influent is different from a source of the second bioreactor influent.

13. The treatment system of claim 1 wherein the second bioreactor, in operation, maintains aerobic conditions, anoxic conditions, anaerobic conditions, or a combination of two or more thereof.

14. The treatment system of claim 1 further comprising a third bioreactor adapted to receive the stream comprising residual solids from the solid-solid separation unit, the third bioreactor having a first inlet for receiving the stream comprising residual solids, a second inlet for receiving a third bioreactor influent, and an outlet for dispensing a third effluent.

15. The treatment system of claim 14 wherein a source of the third bioreactor influent is different from a source of the first and second bioreactor influents.

16. The treatment system of claim 1, wherein the liquid-solid separation unit further comprises a liquid-solid separation unit outlet in fluid communication with the first bioreactor.

\* \* \* \* \*